US012682477B2

(12) United States Patent
Tsutsui et al.

(10) Patent No.: US 12,682,477 B2
(45) Date of Patent: Jul. 14, 2026

(54) FOOT SHAPE MEASUREMENT APPARATUS AND COMPUTER PROGRAM

(71) Applicant: ASICS CORPORATION, Kobe (JP)

(72) Inventors: Masayuki Tsutsui, Hyogo (JP); Mai Nakaya, Hyogo (JP)

(73) Assignee: ASICS CORPORATION, Kobe (JP)

( * ) Notice: Subject to any disclaimer, the term of this patent is extended or adjusted under 35 U.S.C. 154(b) by 419 days.

(21) Appl. No.: 18/304,287

(22) Filed: Apr. 20, 2023

(65) Prior Publication Data

US 2023/0342964 A1     Oct. 26, 2023

(30) Foreign Application Priority Data

Apr. 26, 2022   (JP) ................................. 2022-072592
Feb. 21, 2023   (JP) ................................. 2023-025591

(51) Int. Cl.
*G06T 7/62*        (2017.01)
*G06T 7/564*       (2017.01)
*G06T 19/20*       (2011.01)

(52) U.S. Cl.
CPC ................ *G06T 7/62* (2017.01); *G06T 7/564* (2017.01); *G06T 19/20* (2013.01);
(Continued)

(58) Field of Classification Search
CPC ........... G06T 7/62; G06T 7/564; G06T 19/20; G06T 2207/10004; G06T 2207/30196;
(Continued)

(56) References Cited

U.S. PATENT DOCUMENTS 10,636,158 B1 *   4/2020   Kamiyama ............... G06T 7/50
2016/0286906 A1 *  10/2016  Malal ..................... A43B 17/00
(Continued)

FOREIGN PATENT DOCUMENTS

CN          112955931 A      6/2021
WO      WO-2016121099 A1 *   8/2016   ............... A43D 1/02
(Continued)

OTHER PUBLICATIONS

Park, Yongbeom, Junhee Lee, and Kwangroh Park. "Foot shape classification methods based on image processing for shoe manufacturing." 2019 International Conference on Information and Communication Technology Convergence (ICTC). IEEE, 2019. (Year: 2019).*
(Continued)

*Primary Examiner* — Henok Shiferaw
*Assistant Examiner* — Dion J Satcher
(74) *Attorney, Agent, or Firm* — Studebaker Brackett PLLC

(57)            ABSTRACT

A foot shape measurement apparatus acquires a plurality of foot images captured by an imaging unit imaging a subject's foot from a plurality of angles, and generates a three-dimensional model of the foot. A display controller displays, a target mark indicating a viewpoint position where an imaging viewpoint by the imaging unit in the augmented reality space forms a predetermined angle to the subject's foot and a state mark indicating a current state of the imaging viewpoint by the imaging unit in the augmented reality space to be superimposed on a visual being captured by the imaging unit. An image acquisition unit acquires, as the foot image, the image to be captured when the imaging viewpoint is present in the imaging viewpoint by which a display state of the target mark and a display state of the state mark each satisfy a predetermined condition.

9 Claims, 27 Drawing Sheets

(52) U.S. Cl.
CPC ............... *G06T 2207/10004* (2013.01); *G06T 2207/30196* (2013.01); *G06T 2207/30208* (2013.01)

(58) Field of Classification Search
CPC ....... G06T 2207/30208; G06T 2200/08; G06T 2200/24; G06T 2207/10016; G06T 2207/10024; G06T 2207/30244; G06T 7/579
USPC ........................................................ 382/325
See application file for complete search history.

(56) References Cited

U.S. PATENT DOCUMENTS

| | | | | |
|---|---|---|---|---|
| 2018/0033202 A1* | 2/2018 | Lam | ...................... | G06V 40/10 |
| 2018/0160777 A1* | 6/2018 | Hei | .......................... | G06T 7/521 |
| 2020/0000180 A1* | 1/2020 | Sherrah | .................. | A43D 1/025 |
| 2020/0311429 A1 | 10/2020 | Chen | | |

| | | | | |
|---|---|---|---|---|
| 2021/0345733 A1* | 11/2021 | Maezawa | ................. | A43D 1/02 |
| 2023/0052613 A1* | 2/2023 | Kamiyama | .......... | G06V 40/103 |
| 2023/0298194 A1* | 9/2023 | Doi | ........................ | G01B 11/03 |
| | | | | 382/100 |

FOREIGN PATENT DOCUMENTS

| | | |
|---|---|---|
| WO | 2020/059716 A1 | 3/2020 |
| WO | 2021/150846 A1 | 7/2021 |

OTHER PUBLICATIONS

The extended European search report issued by the European Patent Office on Sep. 11, 2023, which corresponds to European Patent Application No. 23169899.4-1210 and is related to U.S. Appl. No. 18/304,287.

An Office Action mailed by China National Intellectual Property Administration on May 30, 2025, which corresponds to Chinese Patent Application No. 202310406031.6 and is related to U.S. Appl. No. 18/304,287; with English language translation.

* cited by examiner

PLEASE TILT CAMERA TO ALIGN ARROW MARKS
WITH CIRCULAR FRAME IN THE CENTER

142

140

12

PLEASE BRING CAMERA CLOSE TO
TARGET MARK ON SCREEN

PLEASE BRING CAMERA CLOSE TO
TARGET MARK ON SCREEN

PLEASE MOVE SMARTPHONE TO POSITION
FOR OVERLAPPING CIRCULAR FRAME ON
ONE OF SIX CIRCULAR TARGET MARKS

PLEASE MOVE SMARTPHONE TO POSITION
FOR OVERLAPPING CIRCULAR FRAME ON
ONE OF SIX CIRCULAR TARGET MARKS

FOOT SHAPE MEASUREMENT APPARATUS AND COMPUTER PROGRAM

BACKGROUND OF THE INVENTION

1. Field of the Invention

The present invention relates to a foot shape measurement apparatus. In particular, the present invention relates to an apparatus for measuring a foot shape of a subject by image processing.

2. Description of the Related Art

Wearing shoes with sizes that are inappropriate for feet may not only make walking difficult but also affect the health. In recent years, purchase of shoes through online shopping has also become common, but unlike purchase at a store, there are many cases in the purchase of shoes without trying them on. As a result of the purchase without trying them on, an increase in the purchasing of an inappropriate size which leads to an increasing of returning goods and a decrease in a satisfaction level of purchasers. Hence, it is desirable for the purchasers themselves to purchase shoes based on appropriate measurement of their foot size. There is a known technique capable of measuring a foot size of a customer himself/herself also in a place such as a home other than stores (see, for example, WO 2020/059716 A).

SUMMARY OF THE INVENTION

Depending on the type of shoes, even though shoes with slightly loose in size are worn, it does not matter in many cases. However, in a case of sports shoes or in a case of a person having a characteristic foot shape, it is necessary to accurately recognize the size of the foot or the characteristic shape of the foot, and to purchase shoes that match such a size or a shape. On the other hand, the more precisely the foot size and the foot shape are analyzed by a computer, the higher processing capability and the longer processing time of the computer are demanded for its analysis processing. Therefore, ordinary people may not be able to easily measure the foot size or the foot shape by themself.

The present invention has been made in view of the above circumstances, and has an object to provide a technique capable of easily conducting foot shape measurement with high accuracy.

In order to address the above issue, a foot shape measurement apparatus according to an aspect of the present invention includes: an imaging unit; a space setter structured to set an augmented reality space, based on an image captured by the imaging unit; a display controller structured to display, on a screen, the image captured by the imaging unit and a guide object to be arranged in the augmented reality space and to guide an imaging procedure; an image acquisition unit structured to acquire a plurality of foot images that have been captured by the imaging unit imaging a foot of a subject from a plurality of angles; a model generator structured to generate a three-dimensional model of the foot of the subject, based on the plurality of foot images; and a result outputter structured to output a measurement result based on the three-dimensional model that has been generated. The display controller displays, as the guide object, a target mark and a state mark to be superimposed on a visual being captured by the imaging unit, the target mark indicating a viewpoint position in which an imaging viewpoint by the imaging unit in the augmented reality space forms a predetermined angle to the foot of the subject, the state mark indicating a current state of the imaging viewpoint by the imaging unit in the augmented reality space, and the image acquisition unit acquires, as the foot image that has been captured from the predetermined angle, the image to be captured when the imaging viewpoint by the imaging unit in the augmented reality space is present in the imaging viewpoint by which a display state of the target mark and a display state of the state mark each satisfy a predetermined condition.

Note that any combinations of the above components and conversions in expressions of the present invention among a method, apparatus, system, computer program, data structure, recording medium, and the like are also effective as aspects of the present invention.

DETAILED DESCRIPTION OF THE INVENTION

Figure 1:
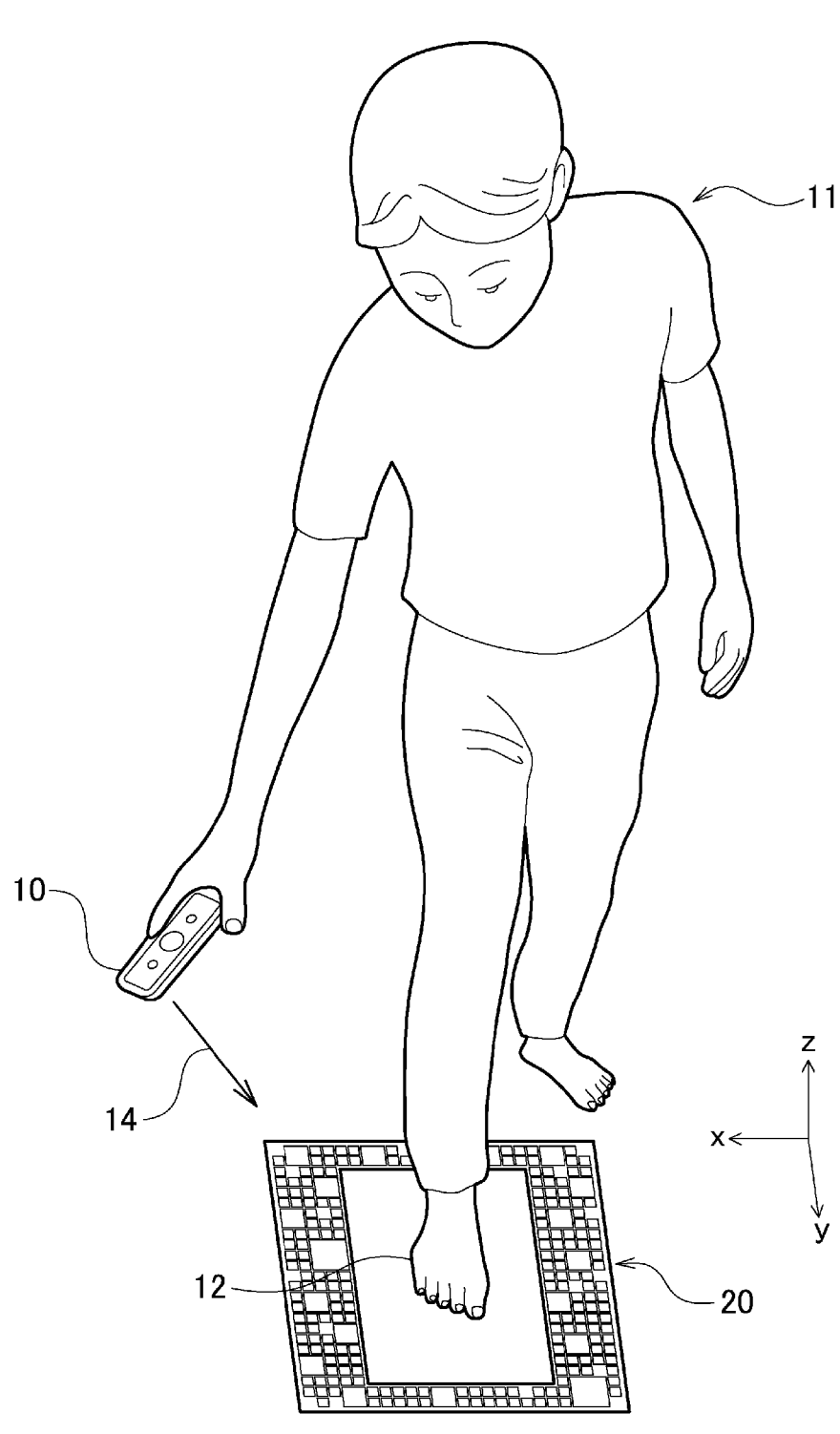
FIG. 1 is a diagram illustrating a posture of a subject while foot shape measurement using a foot shape measurement system is being conducted.

The invention will now be described by reference to the preferred embodiments. This does not intend to limit the scope of the present invention, but to exemplify the invention.

Hereinafter, a foot shape measurement system and a foot shape measurement program will be exemplarily described with reference to the drawings based on preferred embodiments of the present invention. In embodiments and modifications, the same or equivalent components are denoted by the same reference numerals, and overlapping descriptions will be omitted as appropriate.

First Embodiment

FIG. 1 illustrates a posture of a subject while foot shape measurement using a foot shape measurement system is being conducted. A subject 11 images one foot 12 with a camera of a user terminal 10, which is held in a hand to measure the foot shape in a state where the subject's own one foot 12 to be measured is placed in a predetermined position of a reference sheet 20. In the present embodiment, the subject 11 places one foot 12 on the reference sheet 20, and measures the foot shape of one foot 12, by imaging one foot 12 in seven imaging directions 14 in accordance with displayed guidance while looking into a screen display content of the user terminal 10 with its screen facing upward. The user terminal 10 is, for example, a portable terminal such as a smartphone, and images the foot with a built-in camera while looking at a screen display. When the measurement of one foot is completed, the subject 11 places the other foot on the reference sheet 20, and measures the foot shape in a similar procedure.

The procedure in a self-imaging mode in which the subject 11 himself/herself images one foot 12 of the subject 11 will be described in the following. However, instead of the subject 11, another person also can image one foot 12 of the subject 11, as another person's cooperative imaging mode. In the present embodiment, it is supposed that a three-dimensional model is generated, based on an image captured by a camera function, without use of a three-dimensional measurement function by laser image detection such as light detection and ranging (LiDAR).

In the drawing, y axis denotes a front-back direction of the reference sheet 20 and one foot 12, x axis denotes a width direction of the reference sheet 20 and one foot 12, and z axis denotes a vertical axis with respect to xy plane on which the reference sheet 20 is placed. Also in the following drawings, descriptions will be given supposing that a three-dimensional space formed by x axis, y axis, and z axis, which are the same with those in FIG. 1 with the reference sheet 20 as a reference. The screen of the user terminal 10 displays an image in which an object superimposed on position coordinates in a virtual three-dimensional space, in a visual in an augmented reality space corresponding to the three-dimensional space with the reference sheet 20 as a reference, that is, a real space imaged by the camera.

Figure 2:
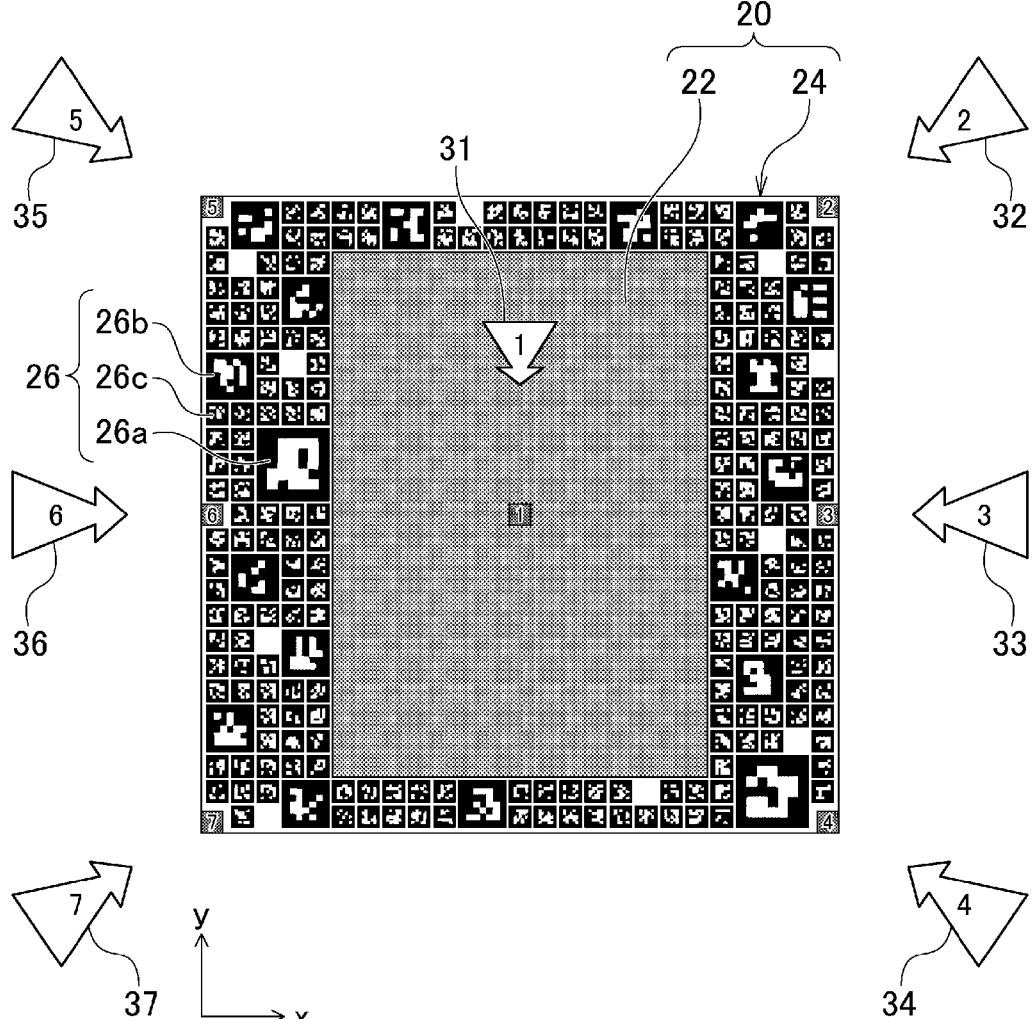
FIG. 2 is a diagram illustrating an outer appearance of a reference sheet.

FIG. 2 illustrates an outer appearance of the reference sheet 20. The reference sheet 20 is a substantially square sheet or mat made of paper or vinyl to be imaged together with one foot 12 of the subject 11 in order to detect position coordinates and a reference length in the augmented reality space. The reference sheet 20 includes a first area 22 and a second area 24. The reference sheet 20 is formed in a square with sides each being, for example, 40 to 45 centimeters.

The first area 22 is an area for placing one foot 12 of the subject 11, and is an area in which a predetermined color that is likely to have a complementary color relationship to the color of the one foot 12 is applied. The predetermined color of the first area 22 is, for example, blue or green. In the present embodiment, light blue is applied as the predetermined color to the first area 22. The first area 22 has a rectangular shape vertically long along y axis, and is surrounded by the second area 24. The lateral width of the first area 22 along x axis is, for example, about 25 centimeters, and is double or more the foot width of the subject 11 who is average. When imaging one foot 12 with the camera from obliquely above a lateral side of one foot 12, the lateral width of the first area 22 has an enough space so that the first area 22 is partially visible over a foot instep, when viewed from an imaging viewpoint. Accordingly, when imaging the foot with the first area 22 as the background, the circumference of the foot is surrounded by the color of the first area 22, so that the contour of the foot can be detected in a more simple manner.

The second area 24 is an area in which a plurality of reference markers 26 each having a predetermined shape to be referred to for detecting position coordinates in the augmented reality space are arranged. As the reference markers 26, markers having various sizes of large, medium, and small (large markers 26a, medium markers 26b, small markers 26c) are arranged. The reference markers 26 are each a label also called an augmented reality (AR) marker, and a program module such as ArUco, which is publicly opened in, for example, Open Source Computer Vision Library (OpenCV), is known.

In the second area 24 in the present embodiment, approximately 300 AR markers of ArUco are arranged as the reference markers 26 each having a square shape. A figure having a unique shape is drawn in each of all the reference markers 26 that are arranged. An ID is assigned to every reference marker 26 beforehand, so that the ID assigned to the reference marker 26 can be identified by recognizing the reference marker 26 in image recognition. A correspondence relationship between the position coordinates of each reference marker 26 and the ID is stored beforehand, so that the position coordinates corresponding to the ID of the reference marker 26 can be identified by identifying the shape of the reference marker 26 in the image recognition with the camera.

The length of each part of the reference sheet 20, which appears in a captured image in the augmented reality space, serves as a reference length, based on the position coordinates, spaces, and arrangements of the plurality of reference markers 26, which appear in the captured image. Regarding the lengths of the respective parts of the reference sheet 20, for example, the spaces between the plurality of reference markers 26, the lengths of the respective sides of the reference sheet 20, and the like, those lengths are known in the real world beforehand. Therefore, it is possible to obtain those lengths in comparison with the reference sheet 20 with the lengths of the respective parts of one foot 12 in the augmented reality space as the reference lengths.

In a plan view of FIG. 2, images are captured from seven imaging directions in a state in which one foot 12 is placed on the reference sheet 20. In the drawing, x axis denotes a left-right direction, y axis denotes an up-down direction, and z axis denotes a vertical axis with respect to xy plane on which the reference sheet 20 is placed. A first imaging direction 31 is a direction in which the user terminal 10 is made to be horizontal near the center in a front half of the first area 22, that is, around the middle finger of one foot 12 or directly above the center of the foot instep and the imaging direction faces generally directly below.

A second imaging direction 32 is a direction in which the user terminal 10 is tilted above a right oblique front side of one foot 12 and the camera is made to face obliquely down toward a right front part of one foot 12. A third imaging direction 33 is a direction in which the user terminal 10 is tilted above a right lateral side of one foot 12 and the camera is made to face obliquely down toward a right lateral part of one foot 12. A fourth imaging direction 34 is a direction in which the user terminal 10 is tilted on a right oblique back side of one foot 12 and the camera is made to face obliquely down toward a right back part of one foot 12.

A fifth imaging direction 35 is a direction in which the user terminal 10 is tilted above a left oblique front side of one foot 12 and the camera is made to face obliquely down toward a left front part of one foot 12. A sixth imaging direction 36 is a direction in which the user terminal 10 is tilted above a left oblique lateral side of one foot 12, and the camera is made to face obliquely down toward a left lateral part of one foot 12. A seventh imaging direction 37 is a direction in which the user terminal 10 is tilted above a left lateral back side of one foot 12, and the camera is made to face obliquely down toward a left back part of one foot 12. Note that in the present embodiment, an example of imaging from seven imaging directions is illustrated. However, the imaging directions are not limited to the seven directions. For example, as a specification, imaging from eight or more imaging directions may be adopted. In this case, the number of imaging steps increases, but there is a possibility that the foot shape can be more accurately measured, as the number of imaging directions increases. On the other hand, as a specification, imaging from smaller than seven directions may be adopted. In this case, as the number of imaging directions decreases, there is a possibility that it becomes more difficult to ensure good measurement accuracy of the foot shape, but there is an advantage that the number of imaging steps can be reduced.

Figure 3A:
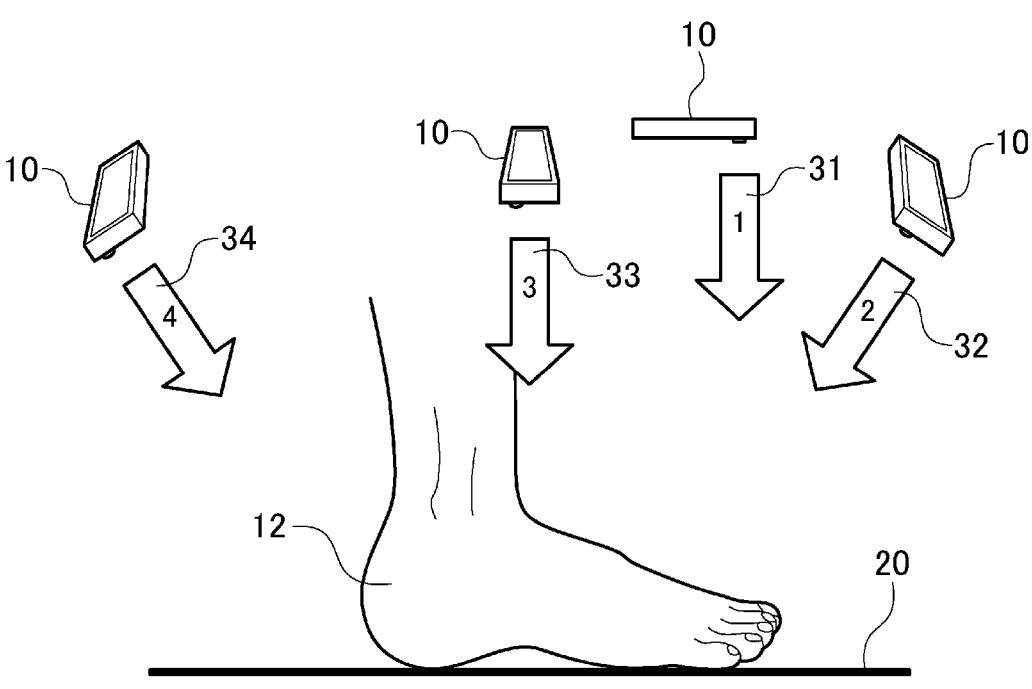
FIGS. 3A and 3B each illustrate a plurality of imaging directions with respect to a foot.
Figure 3B:
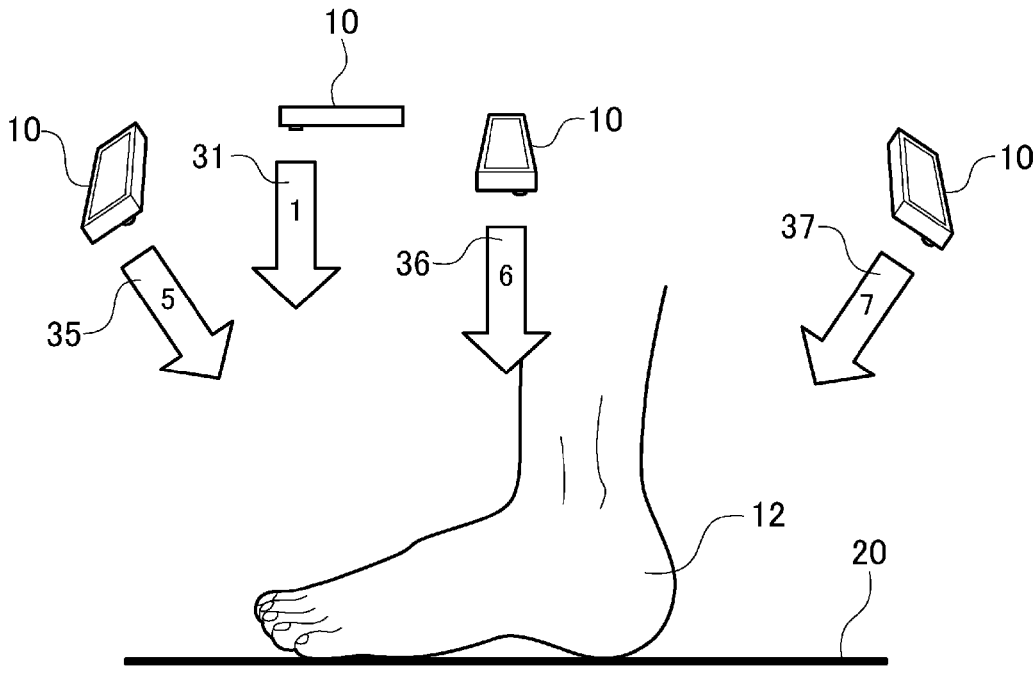

FIGS. 3A and 3B each illustrate a plurality of imaging directions to the foot. FIG. 3A illustrates the imaging directions of one foot 12 in a right side view. The first imaging direction 31 is a direction in which the user terminal 10 is made to be horizontal with an upper end of the user terminal 10 facing to the front side directly above the foot instep from the fingers of one foot 12, and the direction of the camera is substantially vertical. Note that in a case where another person images in another person's cooperative imaging mode, the upper end of the user terminal 10 is made to face toward the subject 11 from an opposite side of the subject 11 for imaging the foot. Thus, a screen content in which the screen content in the self-imaging mode is turned upside down is displayed. Hereinafter, also in the other imaging directions, in another person's cooperative imaging mode, the screen content in which the screen content in the self-imaging mode is turned upside down is displayed. The second imaging direction 32 is a direction in which the user terminal 10 is tilted to lower the upper end of the user terminal 10 above a right oblique front side of one foot 12 and the camera is made to face obliquely down toward a right front part of one foot 12. The third imaging direction 33 is a direction in which the user terminal 10 is tilted to lower the upper end of the user terminal 10 above a right lateral side of one foot 12 and the camera is made to face obliquely down toward a right lateral part of one foot 12. The fourth imaging direction 34 is a direction in which the user terminal 10 is tilted to lower the upper end of the user terminal 10 on a right oblique back side of one foot 12 and the camera is made to face obliquely down toward a right back part of one foot 12.

FIG. 3B illustrates the imaging directions of one foot 12 in a left side view. The first imaging direction 31 is a direction looking down directly from above the fingers or the foot instep of one foot 12. The fifth imaging direction 35 is a direction in which the user terminal 10 is tilted above a left oblique front side of one foot 12 to lower the upper end of the user terminal 10 and the camera is made to face obliquely down toward a left front part of one foot 12. The sixth imaging direction 36 is a direction in which the user terminal 10 is tilted above a left oblique lateral side of one foot 12 to lower the upper end of the user terminal 10 and the camera is made to face obliquely down toward a left lateral part of one foot 12. The seventh imaging direction 37 is a direction in which the user terminal 10 is tilted above a left lateral back side of one foot 12 to lower the upper end of the user terminal 10 and the camera is made to face obliquely down toward a left back part of one foot 12. Note that each imaging direction, that is, a height and an angle of an imaging viewpoint may be changed in accordance with the height of the subject 11, because the posture is constrained and imaging is difficult in some cases in initial settings of the height and the angle of the imaging viewpoint depending on the height and body movability of the subject 11. For example, body information of the subject 11 such as the height, age, and BMI (Body Mass Index) may be input before the measurement is started, so that an appropriate imaging angle may be set, based on a table indicating a correspondence relationship between the body information stored beforehand and the imaging direction. In addition, when a situation in which imaging is conducted again many times while imaging from each imaging direction to be described below or a situation in which it takes a long time to satisfy a condition is detected, the imaging direction may be changed by increasing the height of the imaging viewpoint or the like.

Figure 4:
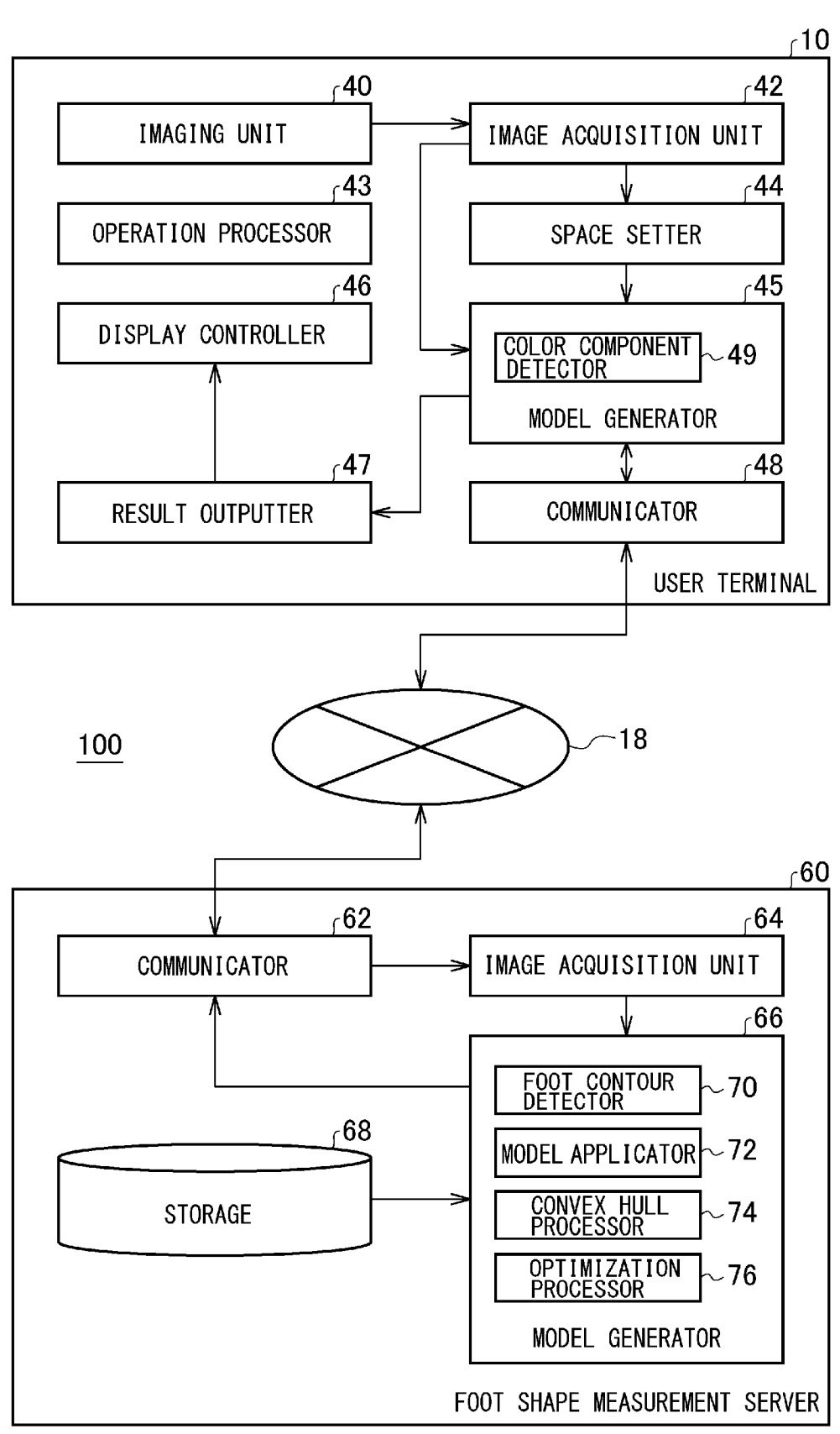
FIG. 4 is a functional block diagram illustrating basic configurations of a user terminal and a foot shape measurement server.

FIG. 4 is a functional block diagram illustrating a basic configuration of the user terminal 10 and a foot shape measurement server 60. A foot shape measurement system 100 includes the user terminal 10 and the foot shape measurement server 60, which are connected through a network 18, such as wireless communication or the Internet. The subject 11 images one foot 12 of his/her own by using the camera function of the user terminal 10, and transmits captured images to the foot shape measurement server 60 through the network 18. The foot shape measurement server 60 generates a three-dimensional model of the foot shape, based on the foot images that have been received, transmits the three-dimensional model to the user terminal 10 to display, on the screen of the user terminal 10, the three-dimensional model and information such as a foot size measured from the three-dimensional model. In the present drawing, block diagrams each focusing on the functions are illustrated, and these functional blocks can be implemented in various forms by hardware, software, or a combination thereof.

The user terminal 10 and the foot shape measurement server 60 each may include a portable terminal or a computer including a central processing unit (CPU), a graphics processing unit (GPU), a random access memory (RAM), a read only memory (ROM), an auxiliary storage device, a display device, a communication device, a camera module, and the like, and a program stored in the portable terminal or the computer. For example, it may be configured such that program processing to be performed on the foot shape measurement server 60 side is performed from the program on the user terminal 10 side through the network 18.

However, it may be configured such that the foot shape measurement system 100 is implemented by a single apparatus having all functions of the user terminal 10 and the foot shape measurement server 60 and a program, so that the subject 11 directly operates the single apparatus, and is able to perform a foot shape measurement program. The single apparatus is not limited to a personal computer, and may be provided in the form of a portable terminal such as a smartphone or a tablet terminal and a program stored in such a computer or terminal. Alternatively, the single apparatus may be implemented in the form of a terminal installed in a shoe store to be operated by an assistant such as a store clerk and a program stored in the terminal.

The user terminal 10 includes an imaging unit 40, an image acquisition unit 42, an operation processor 43, a space setter 44, a model generator 45, a display controller 46, a result outputter 47, and a communicator 48. The imaging unit 40 images one foot 12 of the subject 11 and the reference sheet 20. In terms of hardware, the imaging unit 40 may be constituted of, for example, a camera module built in a smartphone.

The space setter 44 recognizes a position of the reference sheet 20 within an image by image recognition from the image captured by the imaging unit 40, and sets an augmented reality space with the recognized position of the reference sheet 20 as a reference. The image acquisition unit 42 acquires a plurality of foot images captured by the imaging unit 40 imaging one foot 12 of the subject 11 from a plurality of angles. The image acquisition unit 42 acquires, as a foot image, an image that has been captured when the orientation and the tilt angle of the user terminal 10 satisfy a plurality of predetermined imaging direction and angle conditions. The orientation and the tilt angle of the user terminal 10 may be detected by a motion sensor such as an acceleration sensor built in the user terminal 10, or may be detected by image recognition of the position of the reference sheet 20 from a visual being captured by the imaging unit 40. The model generator 45 transmits the plurality of foot images that have been acquired by the image acquisition unit 42 to the foot shape measurement server 60 via the communicator 48. The foot shape measurement server 60 generates a three-dimensional model, based on the plurality of foot images, and returns a measurement result of the foot shape to the model generator 45. The model generator 45 includes a color component detector 49. The color component detector 49 detects a color component range of a predetermined color that is applied to the first area 22 of the reference sheet 20 from the image captured by the imaging unit 40, and stores the color component range. The color component detector 49 transmits information of the color component range to the foot shape measurement server 60 via the communicator 48.

The operation processor 43 receives an operation input as an instruction from the subject 11, in a series of foot shape measurement programs. The display controller 46 causes the screen to display an image captured by the imaging unit 40 and a guide object arranged in the augmented reality space in order to guide an imaging procedure of the foot shape measurement program. The result outputter 47 outputs various measurement results of a foot shape obtained from the three-dimensional model, a foot size based on such a foot shape, and the like. More specifically, the three-dimensional model of the foot shape and the measurement results are displayed on the screen under the control by the display controller 46.

The image acquisition unit 42, the space setter 44, the model generator 45, and the result outputter 47 may be constituted of, for example, a CPU, a GPU, a RAM, a ROM, or the like in terms of hardware. The operation processor 43 and the display controller 46 may be constituted of, for example, a touch panel or the like in terms of hardware. The communicator 48 may be constituted of a wireless communication module of wireless LAN communication, mobile telephone communication, or the like in terms of hardware.

The foot shape measurement server 60 includes a communicator 62, an image acquisition unit 64, a model generator 66, and a storage 68. The image acquisition unit 64 receives a plurality of foot images from the user terminal 10 via the communicator 62. The model generator 66 generates a three-dimensional model of the foot shape, based on the plurality of foot images that have been acquired by the image acquisition unit 42, and returns the three-dimensional model to the model generator 45 of the user terminal 10 via the communicator 62. The model generator 45 of the user terminal 10 generates a three-dimensional model of the foot shape in cooperation with the model generator 66 of the foot shape measurement server 60. The model generator 66 includes a foot contour detector 70, a model applicator 72, a convex hull processor 74, and an optimization processor 76. However, the configuration of the model generator 66 having the functions of the foot contour detector 70, the model applicator 72, the convex hull processor 74, and the optimization processor 76 is merely an example, and a part or all of the functions of the model generator 66 may be provided in the model generator 45. There are various conceivable modifications as to what functions the model generator 45 and the model generator 66 respectively have. The storage 68 stores a three-dimensional homology model in which a coordinate group of anatomical feature points of an average foot is defined in a three-dimensional space. The processing by the model generator 66 and the three-dimensional homology model will be described later.

The communicator 62 may be constituted of a communication module of, for example, a wired LAN or the like in terms of hardware. The image acquisition unit 64 and the model generator 66 may be constituted of, for example, a CPU, a GPU, a RAM, a ROM, or the like in terms of hardware. The storage 68 may be constituted of an auxiliary storage medium such as, for example, a hard disk in terms of hardware.

Figure 5:
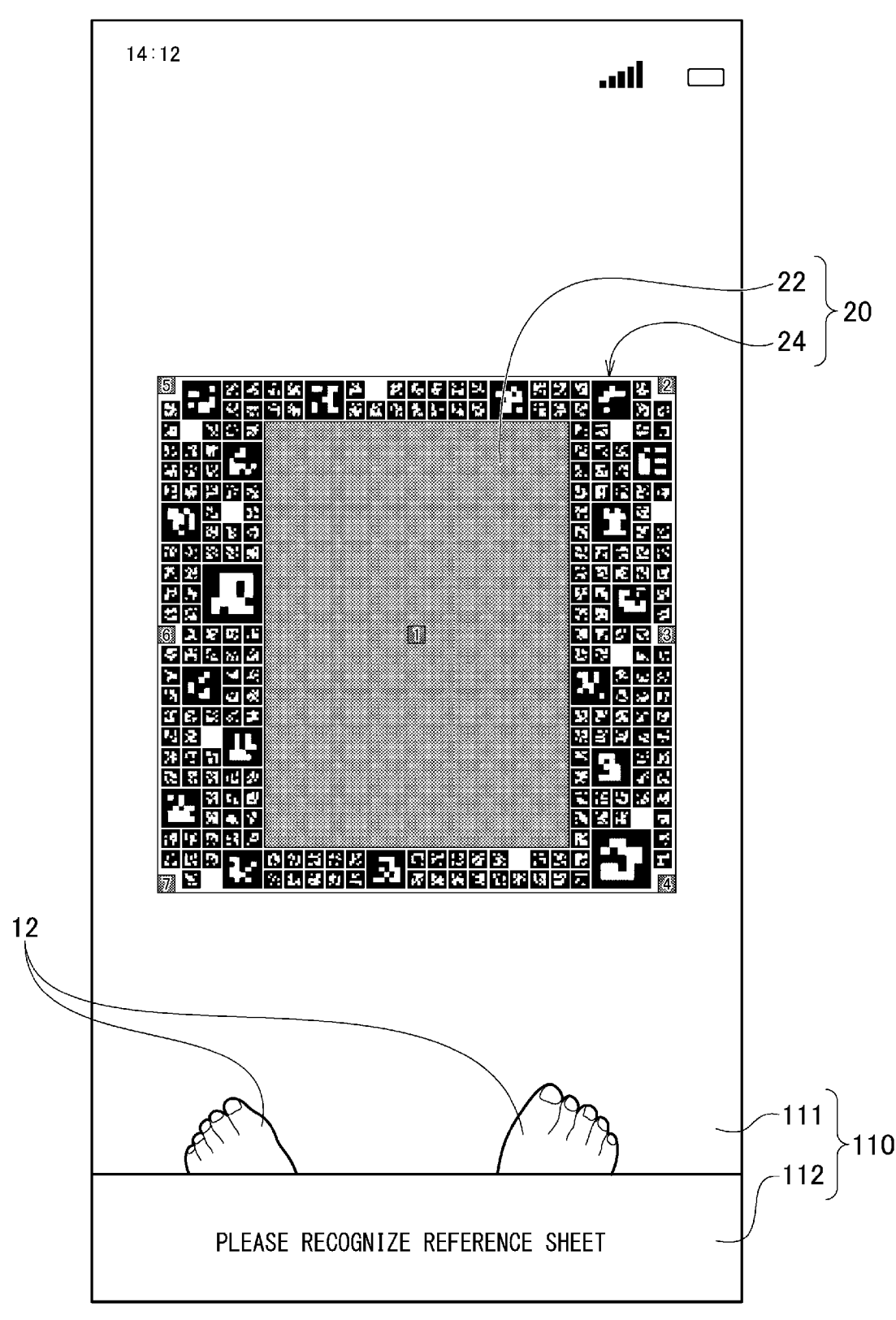
FIG. 5 is a diagram illustrating a screen example of a step of performing image recognition of the reference sheet at the start of the foot shape measurement.
Figure 21:
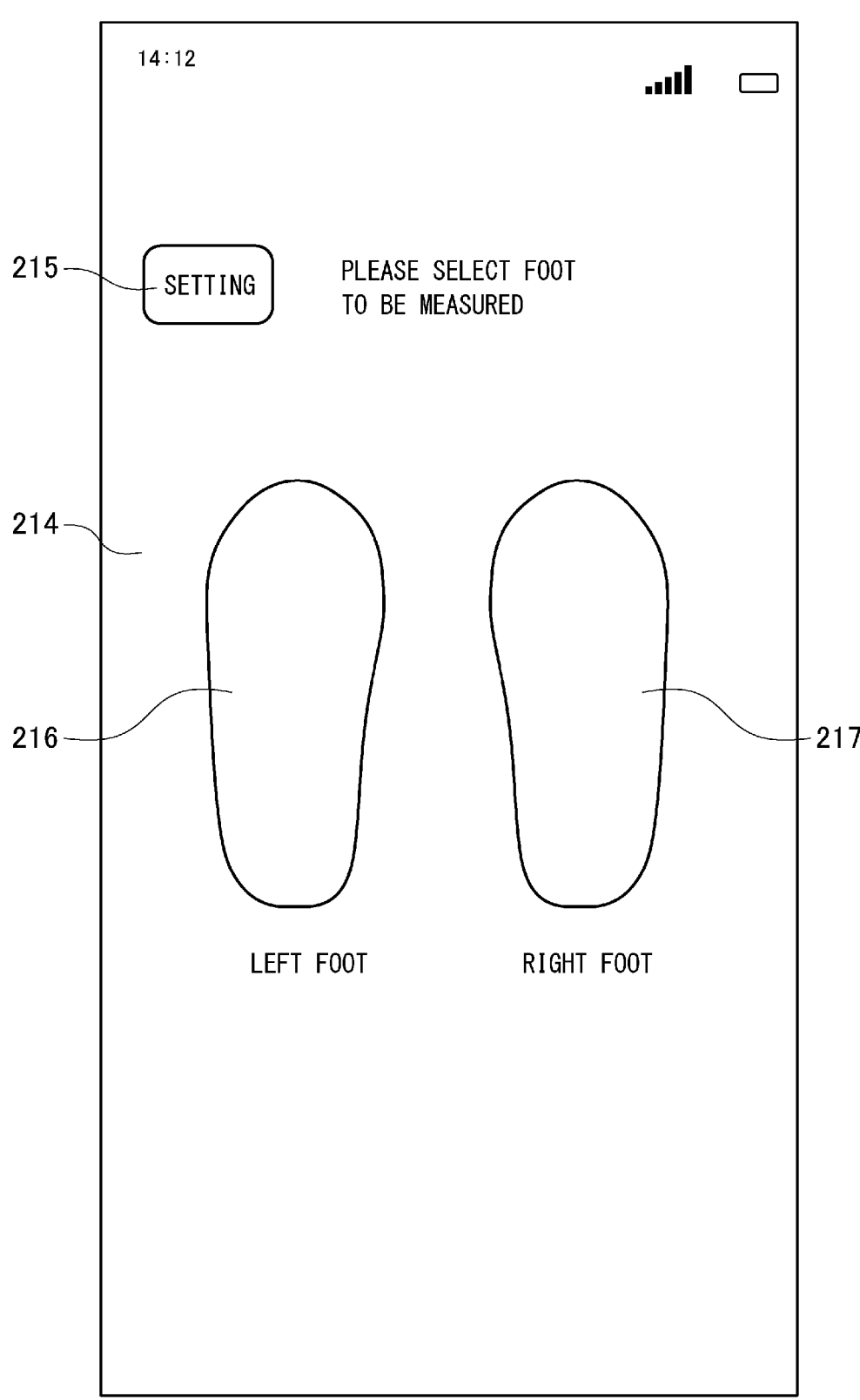
FIG. 21 is a diagram illustrating an example of a one foot selection screen in the second embodiment.

FIG. 5 illustrates a screen example of a step of performing image recognition of the reference sheet 20 at the start of the foot shape measurement. First, a user who operates the user terminal 10 activates a foot shape measurement program, and inputs either a right foot or a left foot is measured first on a screen, as illustrated in FIG. 21. Next, as in the screen example of FIG. 5, the reference sheet 20 is imaged by the camera of the user terminal 10 in a state where the foot is not yet placed on the reference sheet 20. A screen 110 includes an image area 111 and a character area 112. In the image area 111, a visual being captured by the camera is being displayed in real time. In the character area 112, "Please recognize reference sheet" is displayed, and the recognition and detection of the reference sheet 20 is promoted.

When the user brings the camera closer to the reference sheet 20 so that the entire reference sheet 20 is included in the image area 111 within the screen 110, the color component detector 49 of the model generator 45 performs image recognition of the reference sheet 20 from the visual. At this timing, the color component detector 49 recognizes the entire shape and position of the reference sheet 20 from the visual that is being captured, and also detects a color component range of a predetermined color that has been applied to the first area 22. In the first area 22 of the reference sheet 20 in the present embodiment, light blue is uniformly applied as a color having a difference from the color of the foot. However, the saturation and brightness of the light blue that appears in the visual are different depending on the brightness of a room and the illumination degree of light, and thus the color component range of light blue that actually appears in the visual is detected. The model generator 45 transmits information of the color component range to the model generator 66. Thereafter, the foot contour detector 70 of the model generator 66 recognizes the first area 22 from the visual, based on the color component range that has been detected beforehand, and extracts the contour of the foot that appears overlapping the first area 22 from the first area 22, which serves as the background.

As described above, the color component detector 49 detects the color component range of a predetermined color included in the reference sheet 20 that has been recognized from the image captured by the imaging unit 40, before generation of the three-dimensional model. The foot contour detector 70 recognizes a boundary between the foot of the subject 11 and the first area 22 from the foot image, based on the color component range that has been detected, and detects the foot contour of the subject 11. When the recognition of the reference sheet 20 and the detection of the color component range of the first area 22 end, the screen of FIG. 5 transitions to the screen of FIG. 7.

Figure 6:
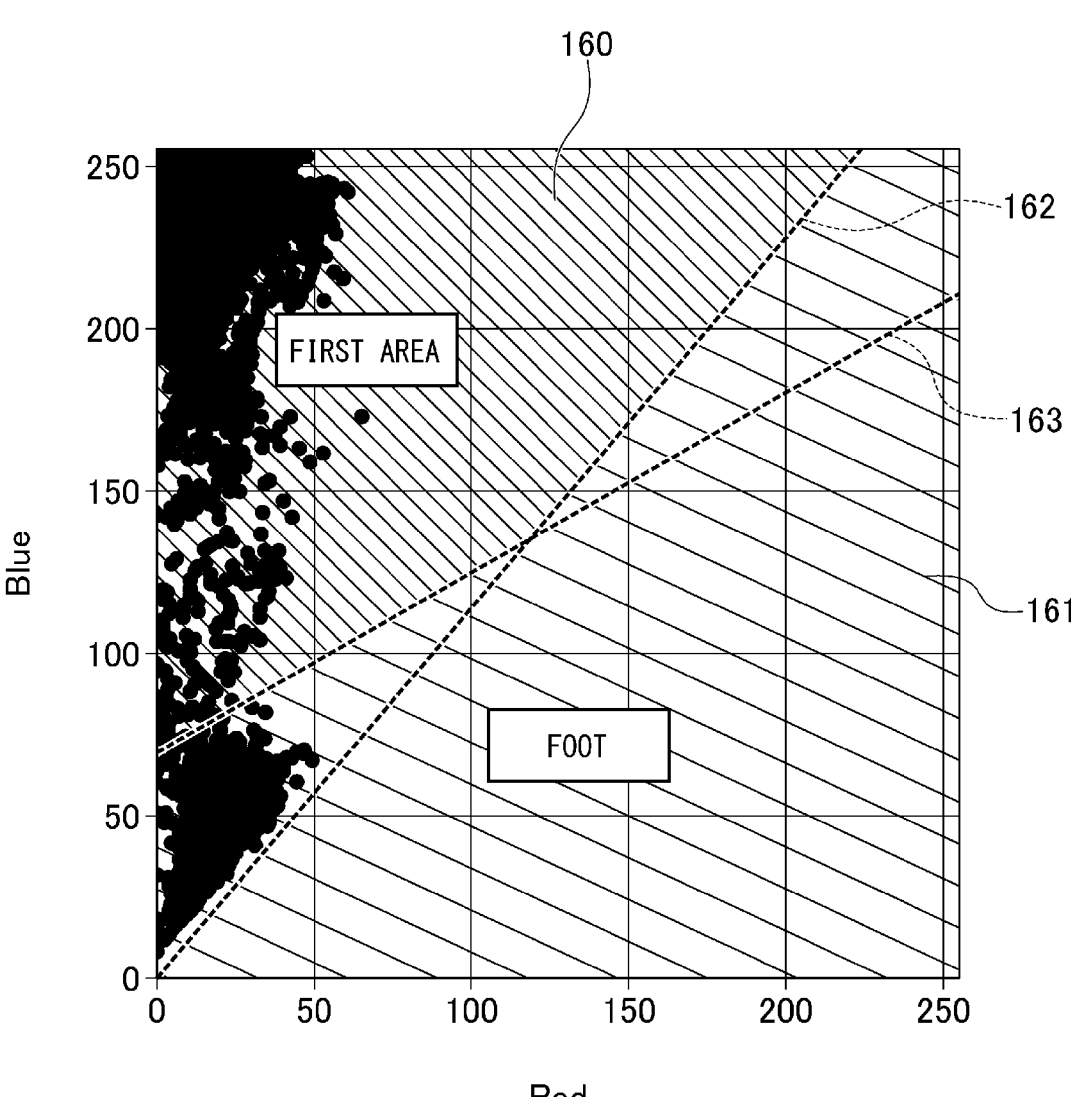
FIG. 6 is a diagram illustrating a color component range included in a first area of the reference sheet.

FIG. 6 illustrates a color component range included in the first area 22 of the reference sheet 20. The graph in the present drawing indicates a distribution of the color components that have been detected from a part in the first area 22 in a case where one foot 12 is imaged in a state in which one foot 12 is actually placed on the reference sheet 20. Among RGB color components, the vertical axis represents values of 256 gradations (0 to 255) of blue, and the horizontal axis represents values of 256 gradations (0 to 255) of red. Here, regarding components of light blue applied to the first area 22, red components are distributed in a range of 0 to a (for example, a is a value of 40 to 70), and blue components are distributed in a range of b to c (for example, b is a value of 40 to 60, and c is a value of 200 to 255). In addition, a range in which the red components are 0 to d (for example, d is a value of 1 to 60) and a range in which the blue components are 0 to e (for example, e is a value of 50 to 80) represent a black part corresponding to a shadow in the vicinity of the contour of the foot. The other areas are considered to be color components that have been detected from a part of the foot.

In a case where R represents a value of a red component and B represents a value of a blue component, a first straight line 162, which is a tangential line to a part corresponding to a black shadow distributed in the graph, has an inclination "255/f" (for example, f is a value of 210 to 230) and an intercept "0". An area on an upper side of the first straight line 162 is represented by an expression "R*255/f<B". In addition, a second straight line 163, which is a tangential line to a part of light blue distributed in the graph has an inclination "g/255" (for example, g is a value of 100 to 255) and an intercept "h" (for example, h is a value of 40 to 100). An area on an upper side of the second straight line 163 is represented by an expression "R*g/255+h<B". Therefore, an area (a first area 160 in the graph) that satisfies conditions of "R*255/f<B" and "R*g/255+h<B" is recognized as the part of the first area 22, and the other area (a second area 161 in the graph) is recognized as the part of one foot 12. The model generator 45 transmits such conditional expressions, as information of the color component range, to the model generator 66. Note that in the present embodiment, an example in which RGB values are detected as the color components has been described. However, as a modification, HSV (hue, saturation, and lightness) values may be detected and used as the information of the color component range.

Figure 7:
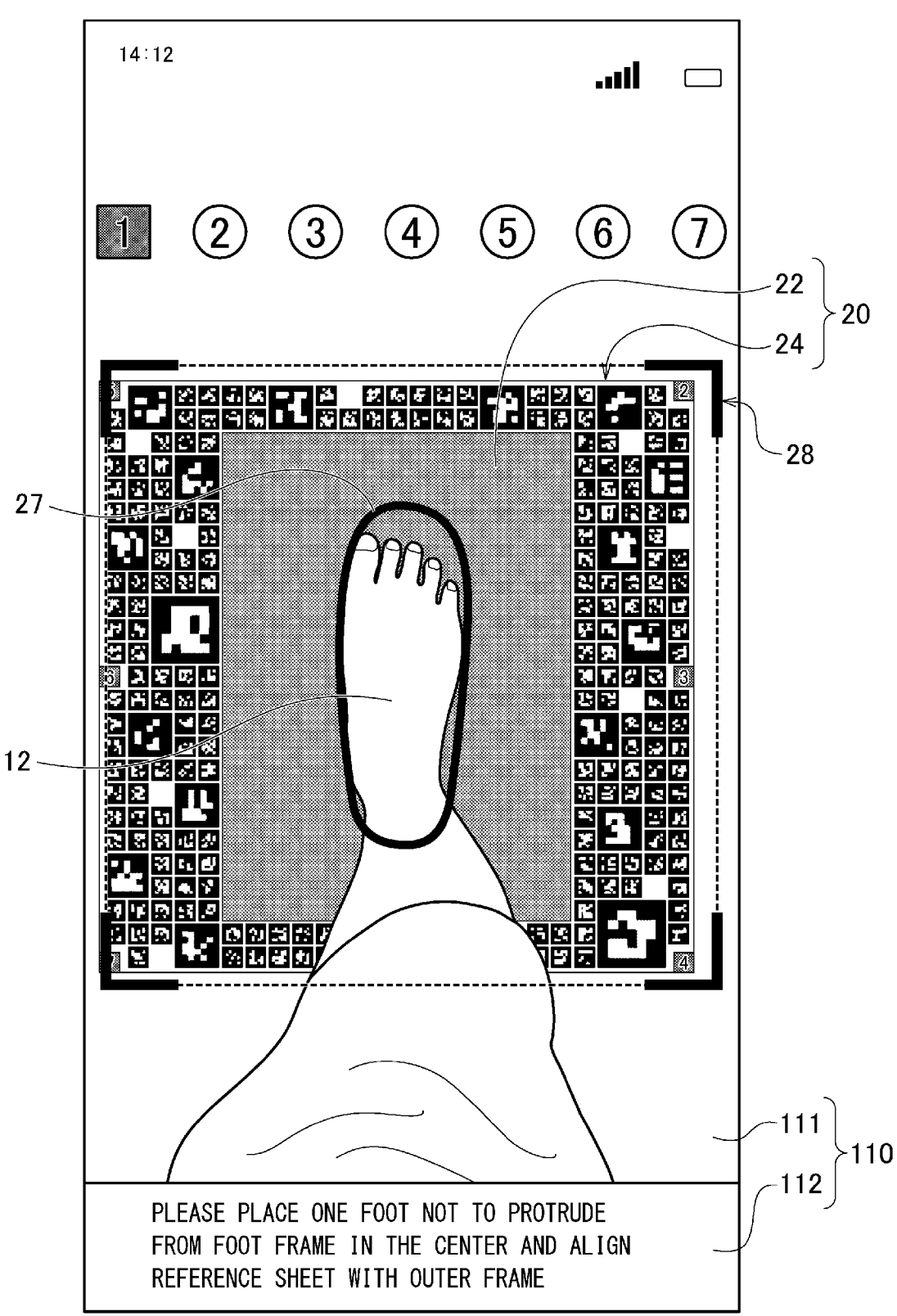
FIG. 7 is a diagram illustrating a screen example of an imaging step in a first imaging direction.

FIG. 7 illustrates a screen example of an imaging step in the first imaging direction. In the image area 111, a visual of the augmented reality space including the reference sheet 20 and various objects superimposed on the visual are projected. The display controller 46 displays "Please place one foot not to protrude from foot frame in the center and align reference sheet with outer frame" in the character area 112, displays an outer frame 28 around the center of the image area 111, and displays a foot frame 27 around the center of the outer frame 28. The user adjusts the distance between the imaging unit 40 and the reference sheet 20 so that the reference sheet 20, which appears in the image area 111, is aligned with the outer frame 28. Then, the distance between the reference sheet 20 and the imaging unit 40 and the imaging direction are adjusted so as to image the foot in the first imaging direction 31 from a first imaging viewpoint. The image acquisition unit 42 acquires an image, when the reference sheet 20 is aligned with the outer frame 28, as a foot image in the first imaging direction 31 from the first imaging viewpoint. After the acquisition of the foot image, the processing proceeds to an imaging step from the next imaging viewpoint. Hereinafter, the imaging step for imaging in the order of the second to seventh imaging viewpoints will be described. However, the imaging order of the second to seventh imaging viewpoints is optional, and imaging may be conducted in a user's desired order.

Figure 8:
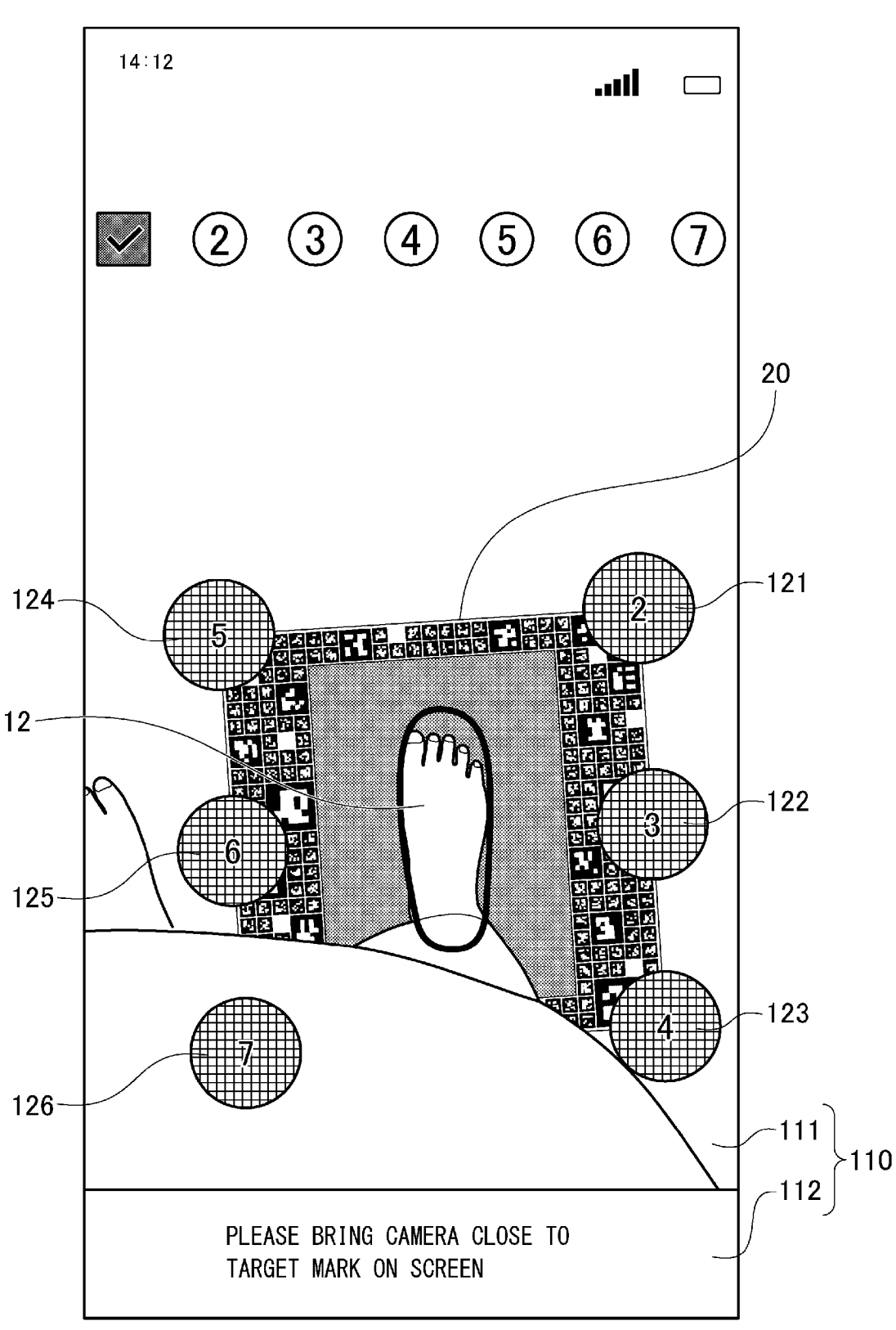
FIG. 8 is a diagram illustrating a start screen example of the imaging step in the second to seventh imaging directions.

FIG. 8 illustrates a start screen example of the imaging step in the second to seventh imaging directions. In the augmented reality space projected on the image area 111, the display controller 46 displays, as guide objects, six viewpoint target marks respectively indicating six imaging viewpoints around the reference sheet 20. The six viewpoint target marks respectively indicate six viewpoint positions, in each of which the imaging viewpoint by the imaging unit 40 has a predetermined angle to the foot of the subject 11, by use of positions and sizes of such marks. The display controller 46 displays "Please bring camera close to target mark on screen" in the character area 112 to prompt the user to bring the imaging viewpoints close to the viewpoint target marks.

The display controller 46 displays a first viewpoint target mark 121 indicating the position of the second imaging viewpoint at the upper right of the reference sheet 20, displays a second viewpoint target mark 122 indicating the position of the third imaging viewpoint at the center of the right side of the reference sheet 20, and displays a third viewpoint target mark 123 indicating the position of the fourth imaging viewpoint at the lower right of the reference sheet 20. The display controller 46 displays a fourth viewpoint target mark 124 indicating the position of the fifth imaging viewpoint at the upper left of the reference sheet 20, displays a fifth viewpoint target mark 125 indicating the position of the sixth imaging viewpoint at the center of the left side of the reference sheet 20, and displays a sixth viewpoint target mark 126 indicating the position of the seventh imaging viewpoint at the lower left of the reference sheet 20.

The first viewpoint target mark 121, the second viewpoint target mark 122, the third viewpoint target mark 123, the fourth viewpoint target mark 124, the fifth viewpoint target mark 125, and the sixth viewpoint target mark 126 each indicate the distance between each imaging viewpoint and the imaging unit 40 by its display size. That is, each viewpoint target mark is displayed to be a smaller circle, as the imaging unit 40 is farther from the floor, and the circle of each viewpoint target mark is displayed larger, as the imaging unit 40 approaches the height of the imaging viewpoint. When the user brings the imaging viewpoint of the imaging unit 40 closer to the first viewpoint target mark 121 in the augmented reality space projected on the image area 111, the processing proceeds to the imaging step in the second imaging direction 32.

Figure 9:
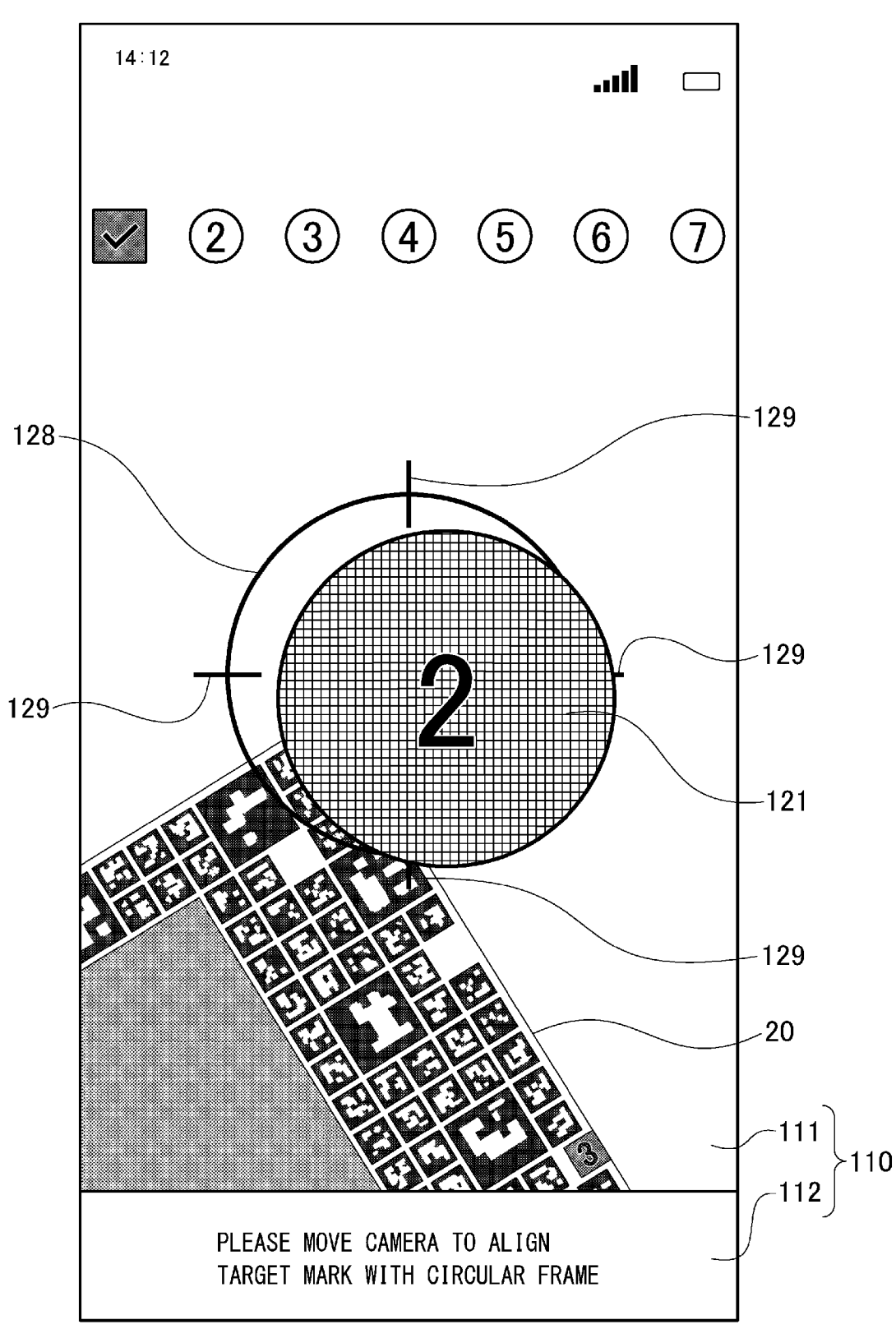
FIG. 9 is a diagram illustrating a screen example of an alignment step of a second imaging viewpoint.

FIG. 9 illustrates a screen example of an alignment step of the second imaging viewpoint. The display controller 46 displays the first viewpoint target mark 121 and a viewpoint state mark 128, as guide objects, in the augmented reality space projected on the image area 111. The viewpoint state mark 128 is a circular frame line indicating a state of the current imaging viewpoint of the imaging unit 40, in the augmented reality space. The viewpoint state mark 128 is fixed in a predetermined position and a predetermined display size. The display controller 46 displays "Please move camera to align target mark with circular frame" in the character area 112, and prompts the user to move the user terminal 10 toward the second imaging viewpoint. When the user brings the imaging viewpoint of the imaging unit 40 closer to the first viewpoint target mark 121, the position and the display size of the first viewpoint target mark 121 get closer to the position and the display size of the viewpoint state mark 128. When the user brings the imaging viewpoint of the imaging unit 40 closer to the first viewpoint target mark 121, the user terminal 10 vibrates by means of a haptic technology at an intensity or a vibration frequency in accordance with closeness between the positions and the display sizes of the viewpoint state mark 128 and the first viewpoint target mark 121. When the positions and sizes of the viewpoint state mark 128 and the first viewpoint target mark 121 substantially overlap with each other, the display controller 46 indicates that the position of the current imaging viewpoint is present in an imaging viewpoint that satisfies a predetermined position condition. More specifically, when the differences between the position and the display size of the first viewpoint target mark 121 and the position and the display size of the viewpoint state mark 128 respectively fall within predetermined ranges, the imaging unit 40 is considered to have almost reached the second imaging viewpoint, and the first viewpoint target mark 121 is changed to a target mark to be described in the next drawing.

Here, four direction suggesting marks 129 each being a short radial line are displayed at 90 degree intervals in a supplemental manner on the circumference of the viewpoint state mark 128. Among the four direction suggesting marks 129, the upper and lower direction suggesting marks 129 are arranged along an intended imaging direction, and indicate the direction from an imaging viewpoint of the imaging unit 40 toward one foot 12 of the subject 11. When the direction suggesting marks 129 attract the user's attention, it is expected that the user unconsciously tries to align the direction of the user terminal 10 with the imaging direction, and it is possible to smoothly shift to the next adjustment of the tilt angle. However, when the first viewpoint target mark 121 overlaps the viewpoint state mark 128, the display controller 46 allows the first viewpoint target mark 121 to be changed to a target mark to be described in the next drawing, even though the direction from the imaging viewpoint of the imaging unit 40 toward one foot 12 of the subject 11 is not a direction along the direction suggesting mark 129. At the time of aligning the positions of the first viewpoint target mark 121 and the viewpoint state mark 128 with each other, it is desirable in terms of imaging efficiency that the orientation of the screen of the user terminal 10 is parallel to the second imaging direction. However, even though it is not necessarily parallel at this timing, it is sufficient if the orientation can be aligned in parallel in the next step. Note that as a modification, instead of adding the direction suggesting mark 129 to the viewpoint state mark 128 having a circular shape, a viewpoint state mark 128 having a polygonal shape such as a pentagon may be used for indicating an intended imaging direction.

Figure 10:
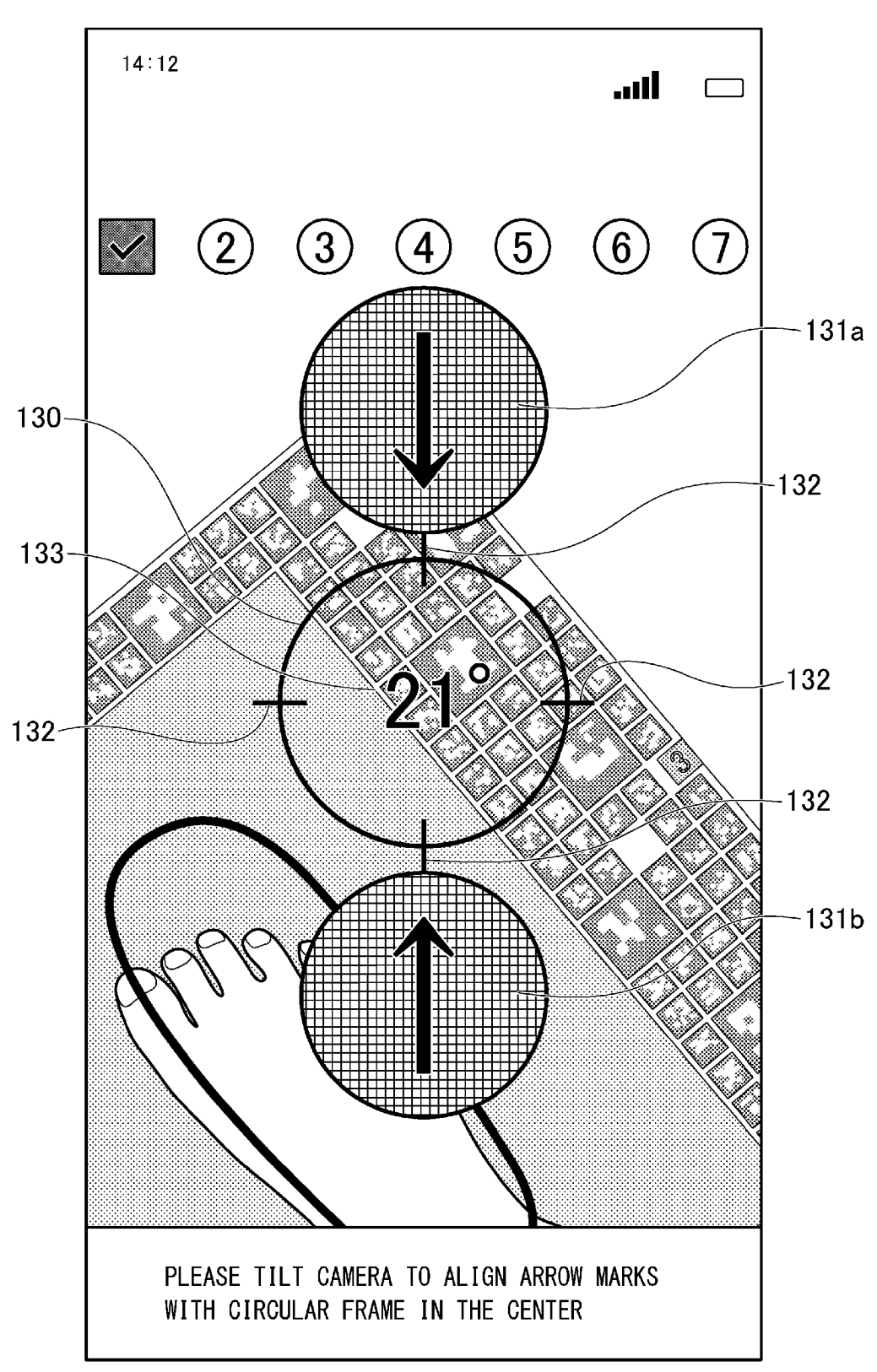
FIG. 10 is a diagram illustrating a screen example of a tilt adjustment step in the second imaging direction.

FIG. 10 illustrates a screen example of a tilt adjustment step in the second imaging direction. The display controller 46 displays a tilt target mark 130 and a pair of tilt state marks 131, as guide objects, in the augmented reality space projected on the image area 111. The tilt target mark 130 is a circular frame line, and indicates the target of the tilt angle of the imaging unit 40 that satisfies a predetermined condition by use of a position of a mark. The display controller 46 displays the tilt target mark 130 at the center of the image area 111. The tilt target mark 130 is fixed in a predetermined position and a predetermined display size, and is displayed to be sandwiched between the pair of tilt state marks 131 (tilt state marks 131a and 131b).

The tilt state marks 131a and 131b are both circular marks, and indicate, by use of the positions of the marks, the tilt angle of the imaging unit 40 from the current imaging viewpoint of the imaging unit 40, in the augmented reality space. Arrows respectively pointing the tilt target mark 130 are displayed in the tilt state marks 131a and 131b. The user performs an operation of tilting the user terminal 10 to face the imaging direction of the imaging unit 40 toward one foot 12. As the tilt angle of the user terminal 10 gets closer to an intended tilt angle, the tilt state marks 131a and 131b respectively move in the directions of the tilt target mark 130, that is, in the directions of the arrows respectively displayed in the tilt state marks, and overlap the tilt target mark 130. When the tilt angle of the user terminal 10 gets closer to the intended tilt angle, the user terminal 10 vibrates by means of the haptic technology at an intensity or a vibration frequency in accordance with closeness between the tilt angle of the user terminal 10 and the target tilt angle.

When the tilt of the user terminal 10 deviates rightward from the target tilt, the tilt state mark 131*a* on an upper side moves leftward, and the tilt state mark 131*b* on a lower side moves rightward. The user tilts the user terminal 10 while adjusting the left and right tilts so that the tilt state mark 131*a* is positioned immediately above the tilt target mark 130 and the tilt state mark 131*b* is immediately below the tilt target mark 130. The display controller 46 displays the difference between the tilt angle of the user terminal 10 and the intended tilt angle in numerals inside the tilt target mark 130. In the drawing, "21°" is displayed, and the user terminal 10 is tilted so that this numerical value becomes 0. The orientation and the tilt angle of the user terminal 10 may be detected by a motion sensor such as an acceleration sensor built in the user terminal 10, or may be detected by image recognition of the position of the reference sheet 20 from a visual being captured by the imaging unit 40.

Here, four direction suggesting marks 132 each being a short radial line are displayed at 90 degree intervals in a supplemental manner on the circumference of the tilt target mark 130. Among the four direction suggesting marks 132, the upper and lower direction suggesting marks 132 are arranged along a target imaging direction, and indicate the direction from the imaging viewpoint of the imaging unit 40 toward one foot 12 of the subject 11. When the user operates for changing the tilt of the imaging unit 40, and the tilt state marks 131*a* and 131*b* overlap the tilt target mark 130 and stand still, the display controller 46 indicates that the tilt angle of the imaging unit 40 from the current imaging viewpoint is the tilt angle that satisfies the predetermined condition. Note that as a modification, instead of adding the direction suggesting mark 132 to the tilt target mark 130 having a circular shape, a tilt target mark 130 having a polygonal shape such as a pentagon may be used for indicating the target imaging direction.

Figure 11:
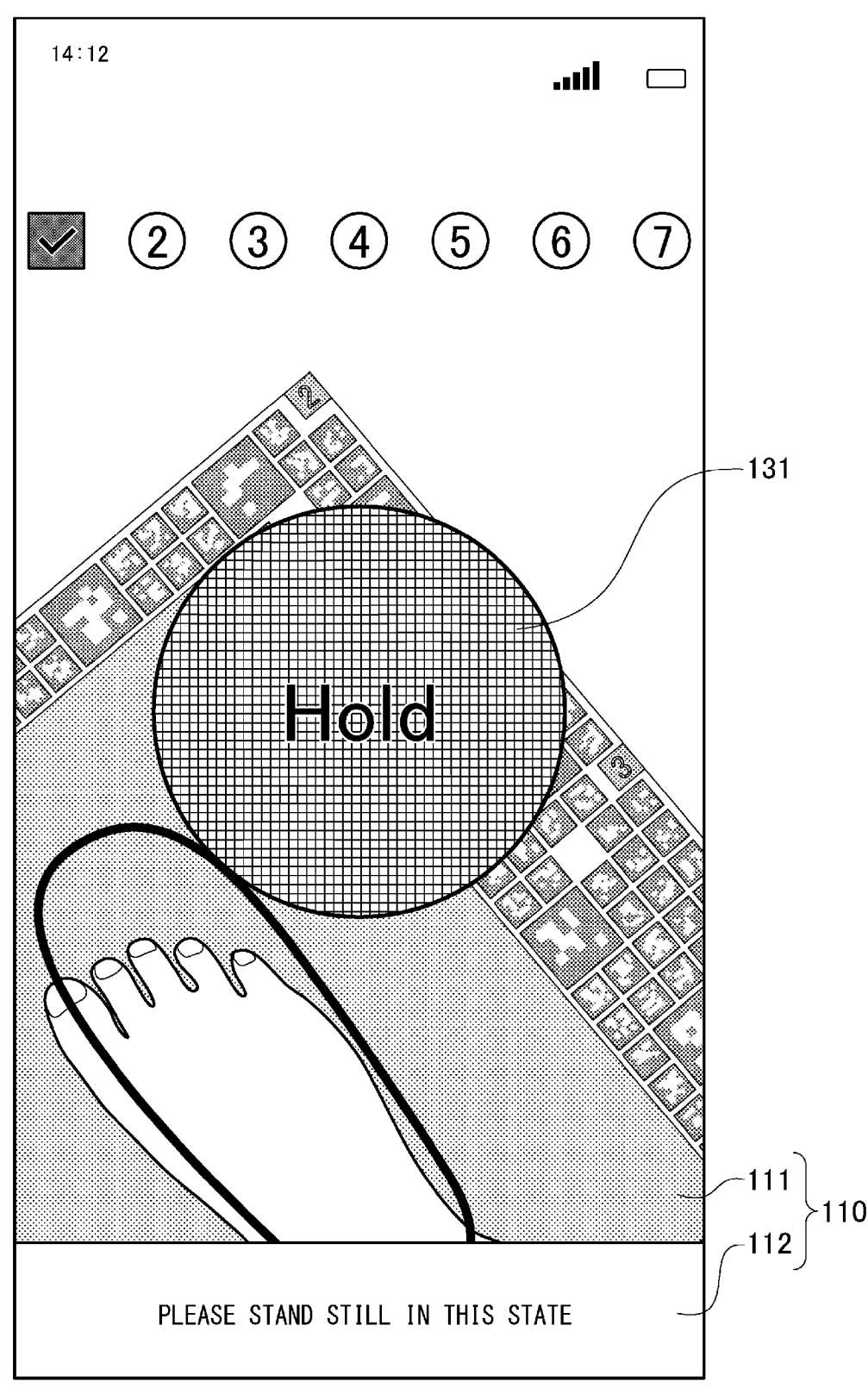
FIG. 11 is a diagram illustrating a screen example for instructing the imaging unit to stand still.

FIG. 11 illustrates a screen example for instructing the imaging unit 40 to stand still. When the tilt state mark 131 and the tilt target mark 130 overlap with each other, a character "Hold" is displayed inside the tilt state mark 131 and characters "Please stand still in this state" are displayed in the character area 112 so as to prompt the user to stop moving the tilt of the imaging unit 40. While the user stops moving the user terminal 10, the image acquisition unit 42 acquires an image that appears in the image area 111, as a foot image that has been captured from an angle in the second imaging direction. Such a foot image is an image when the imaging viewpoint of the imaging unit 40 in the augmented reality space is present in an imaging viewpoint in which the display state of the target mark and the display state of the state mark respectively satisfy the predetermined conditions.

Figure 12:
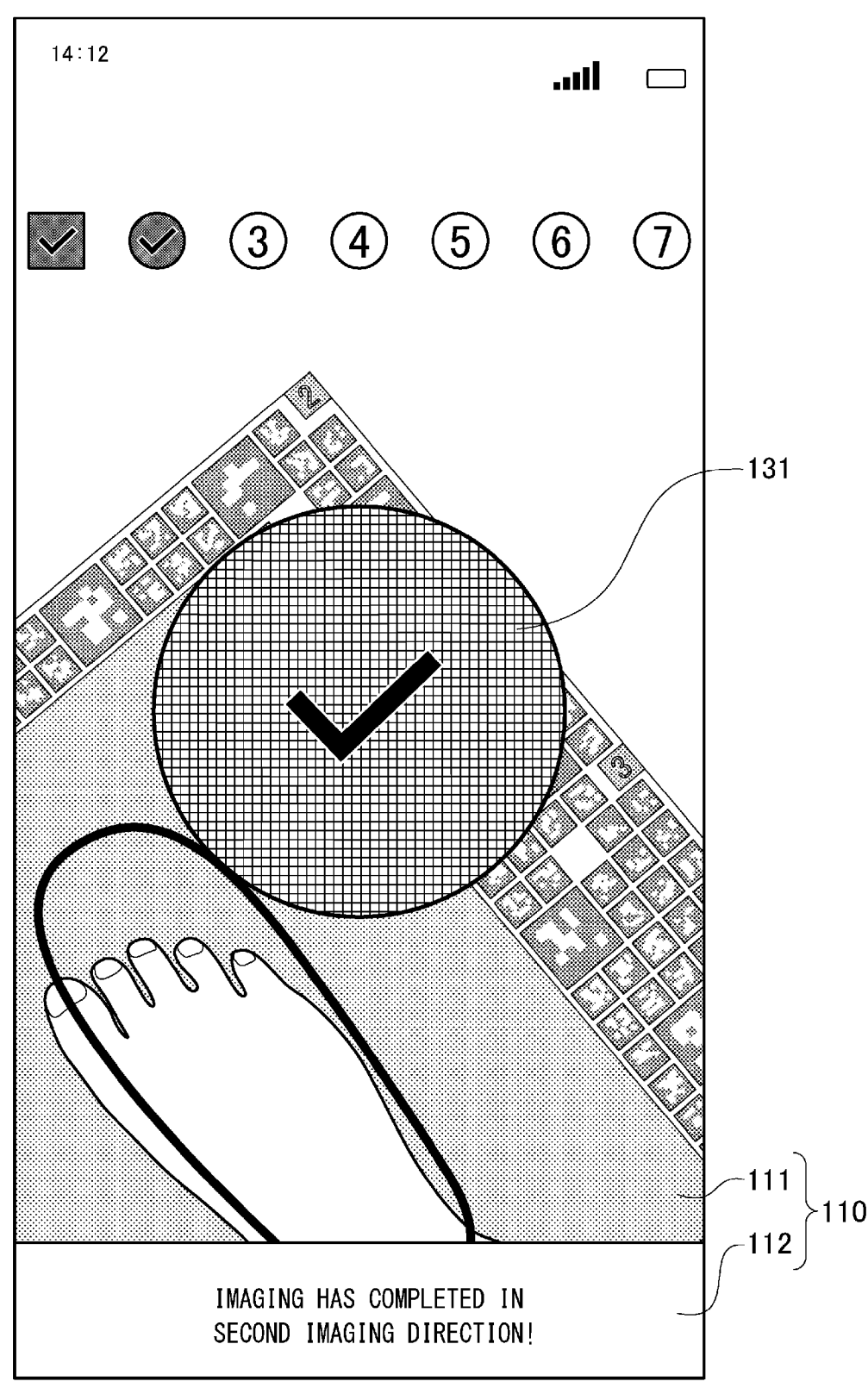
FIG. 12 is a diagram illustrating a screen example indicating completion of acquisition of a foot image from the second imaging direction.

FIG. 12 illustrates a screen example indicating completion of acquisition of the foot image from the second imaging direction. A mark indicating the completion is displayed inside the tilt state mark 131. At this timing, a sound output indicating the completion and a short vibration of the user terminal 10 by means of the haptic technology indicating the completion are conducted. Accordingly, the user is able to easily grasp that imaging has been completed by sound or haptics. In particular, even in a place where surrounding sounds are noisy, it is possible to easily learn about the completion of imaging by the vibration transmitted to a hand. In this manner, imaging of the foot image from the second imaging direction ends. Also in the third to seventh imaging directions, the user acquires the foot image from each imaging direction in a similar step.

Figure 13:
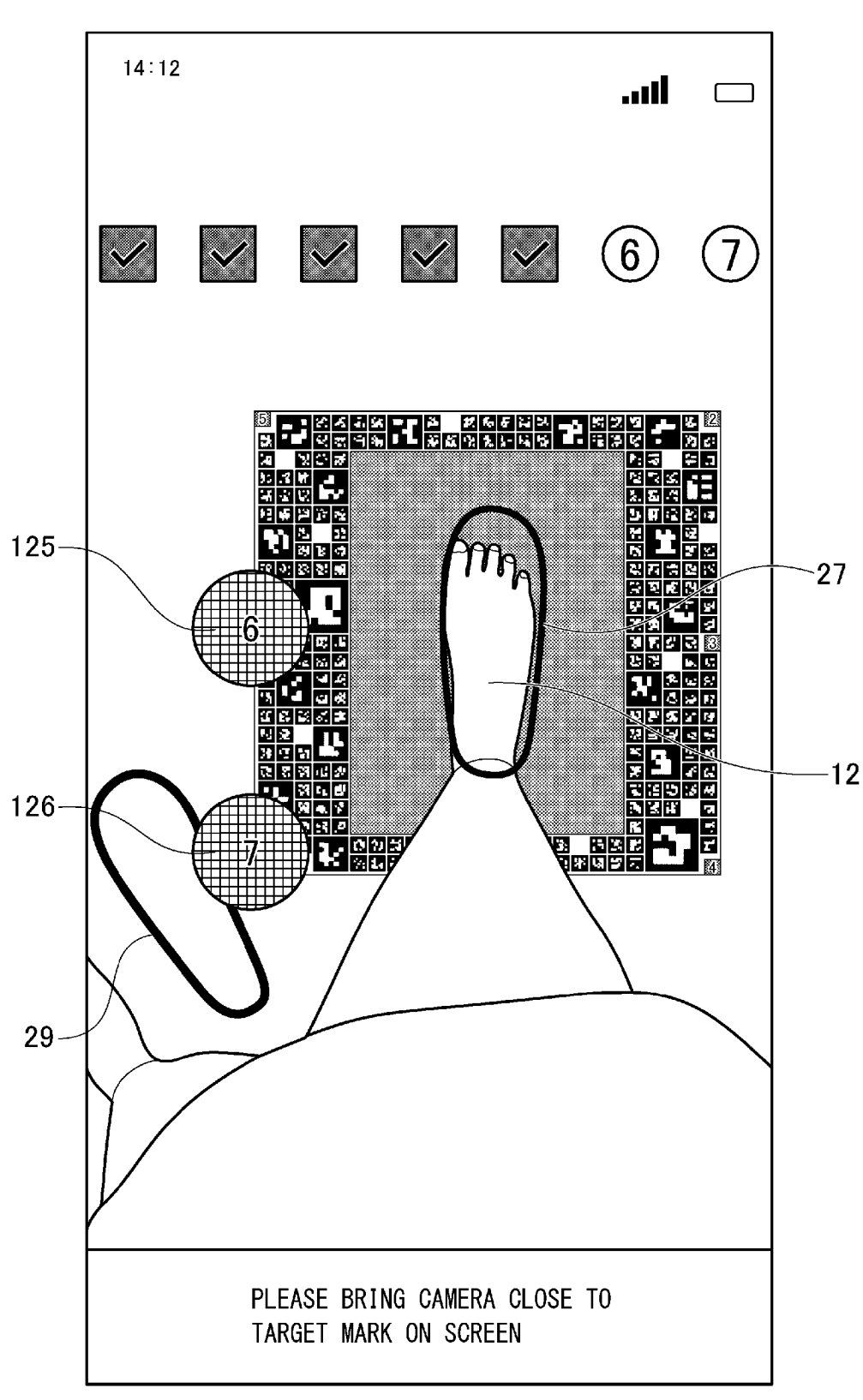
FIG. 13 is a diagram illustrating a screen example for guiding a position for placing the other foot that is not to be measured.

FIG. 13 illustrates a screen example for guiding a position for placing the other foot that is not to be measured. The display controller 46 causes the foot frame 27 to be superimposed and displayed as a first foot shape mark indicating an area for placing one foot 12 to be measured, in a predetermined position of the reference sheet 20 that has been imaged by the imaging unit 40. On the other hand, the display controller 46 displays a second foot shape mark 29 in a position preferable for placing the other foot that is not to be measured in the outside of the reference sheet 20. The second foot shape mark 29 indicates the position of the other foot such that a gravity center position of the subject 11 is included within a base of support when the imaging viewpoint has a predetermined angle to the foot of the subject 11. The base of support denotes an imaginary area that surrounds including positions in which both feet are placed on the floor, and it can be said that a state in which a gravity center line of the body is closer to the center of the base of support means higher stability of the body balance. The second foot shape mark 29 is displayed in a position in which the base of support capable of keeping the stability of the body balance can be obtained. Regarding the position in which the second foot shape mark 29 is displayed, a position appropriate for the posture to be imaged in the imaging direction from the imaging viewpoint is defined and stored beforehand for every imaging viewpoint. Note that the second foot shape mark 29 may be displayed, only in a case of the imaging direction in which the posture is constrained depending on the position in which the other foot is placed and imaging is likely to be difficult, for example, in the fourth imaging direction 34 or the seventh imaging direction 37. Alternatively, in a case of an imaging direction in which it has been detected that imaging is conducted many times again while imaging, or in a case of an imaging direction in which it has been detected that it takes a long time to satisfy a condition, the second foot shape mark 29 may be displayed to guide toward an appropriate position for placing the foot.

Figure 14:
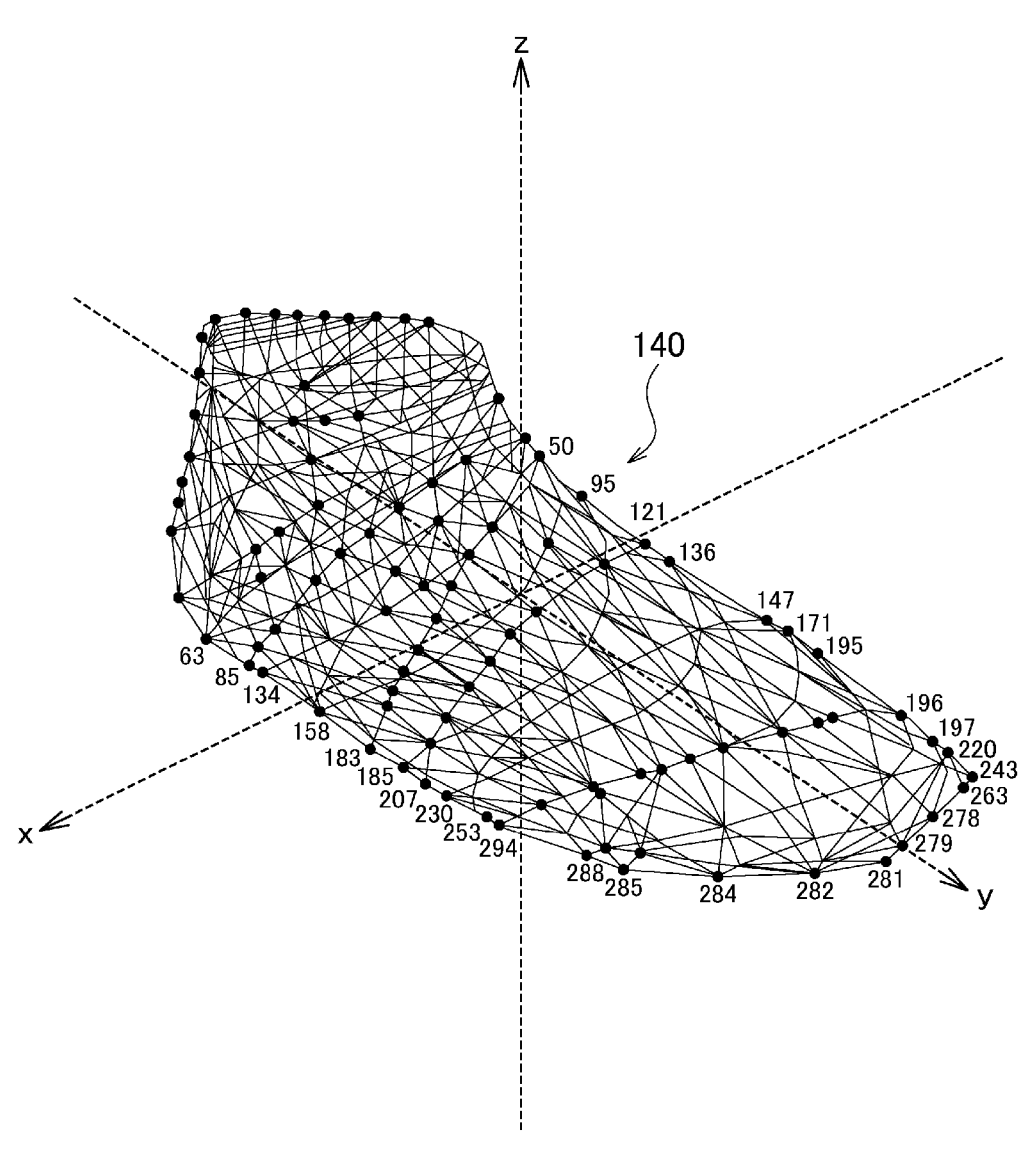
FIG. 14 is a diagram illustrating a three-dimensional homology model and a predetermined number of contour points.

FIG. 14 illustrates a three-dimensional homology model and a predetermined number of contour points. A three-dimensional homology model 140 is a model in which a coordinate group of anatomical feature points of an average foot is defined in a three-dimensional space, and is stored in the storage 68 beforehand. The anatomical feature points of the average foot are obtained beforehand, based on foot samples that have been obtained from many subjects. In the three-dimensional homology model 140, a predetermined number, for example, 295 contour points are defined. The three-dimensional homology model 140 in the present drawing is constructed with 295 contour points and lines each connecting between the contour points. As illustrated in the drawing, an ID of a unique number (range of 1 to 295) is assigned to each contour point.

The model applicator 72 of the model generator 66 applies the three-dimensional homology model of the average foot that has been stored beforehand in the storage 68 to the contour of the foot (hereinafter, also referred to as "foot contour") that has been detected from a plurality of foot images. There is no complete similarity between the foot contour that has been detected and the three-dimensional homology model 140. Hence, the three-dimensional homology model 140 does not exactly match the foot contour unless it de forms. Therefore, the model applicator 72 superimposes the three-dimensional homology model 140 to be initially applied in a rough range narrower than the detected foot contour.

Figure 15:
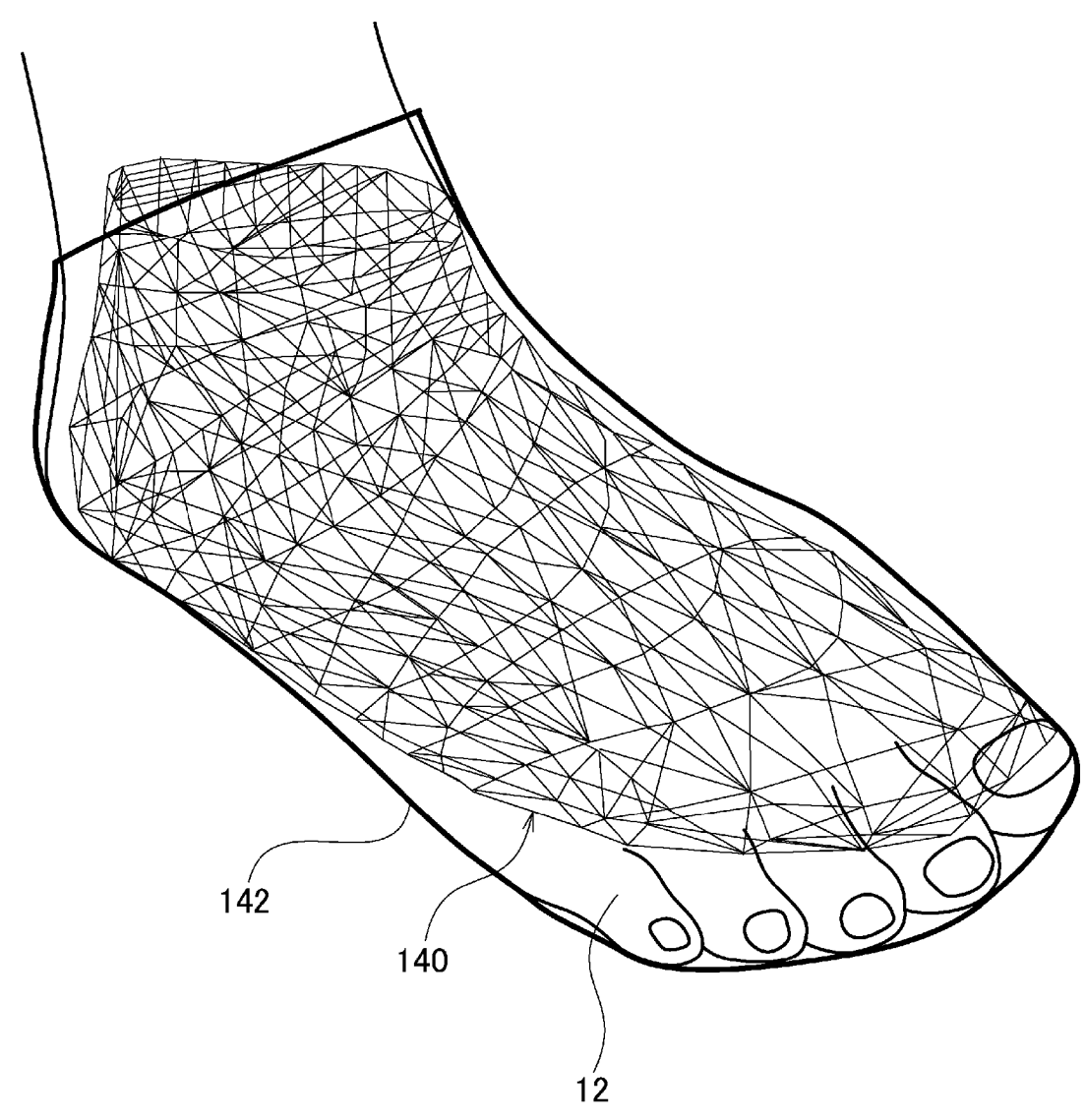
FIG. 15 is a diagram illustrating a state in which the three-dimensional homology model is superimposed on a foot contour detected from the foot image.

FIG. 15 illustrates a state in which the three-dimensional homology model is superimposed on the foot contour detected from the foot image. The present drawing illustrates a state in which the three-dimensional homology model 140 is simply scaled up or down with a rough magnification, and is superimposed on a foot contour 142, which has been detected from the foot image by the model applicator 72. In this state, the three-dimensional homology model 140, which is a model of the average foot, does not have a complete similarity to the foot contour of the subject 11, and thus the contour points of the three-dimensional homology model 140 do not match the foot contour of the subject 11.

Figure 16A:
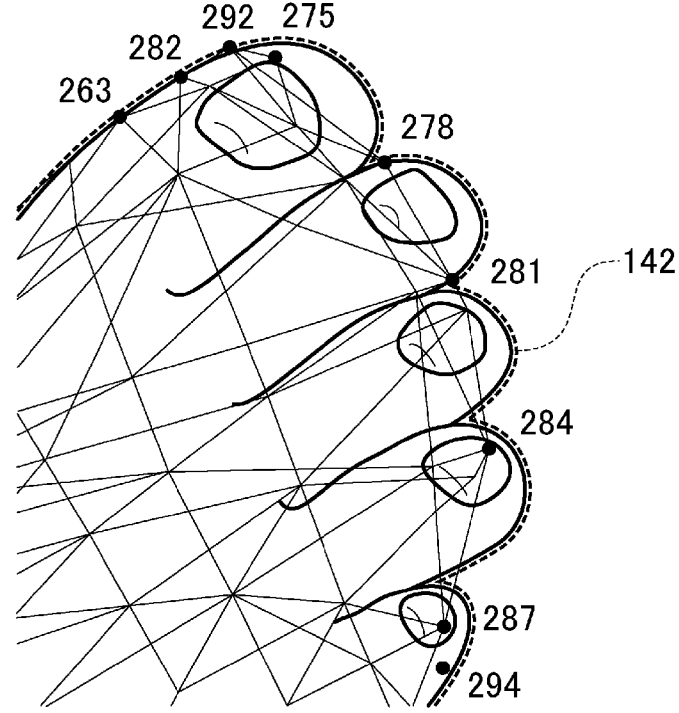
FIGS. 16A and 16B are each a diagram illustrating convex hull processing for contours of toes.
Figure 16B:
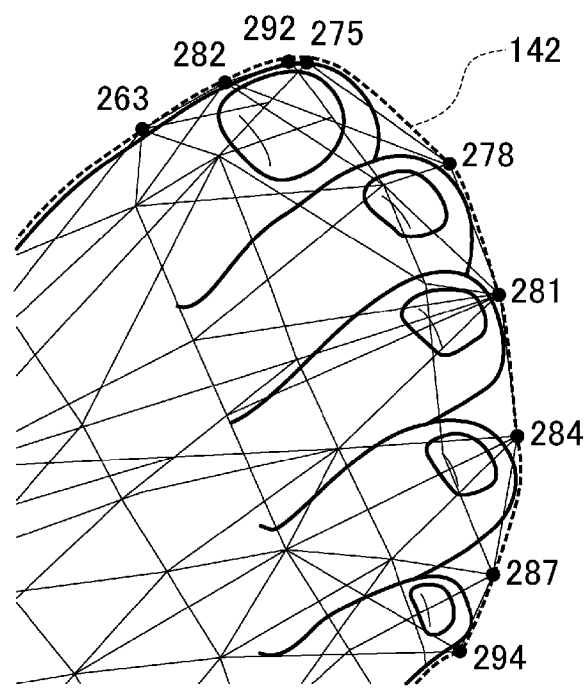

FIGS. 16A and 16B each illustrate convex hull processing for contours of toes. FIG. 16A illustrates an initial state in which the three-dimensional homology model 140 is applied to the foot contour 142, which has been detected from the foot image. Generally, the contours of the toes have unevenness, in particular, a convexity defect or a recessed portion is present between the toes. Hence, in aligning with the contours strictly, which means excessively following the respective convexity defects between the toes, and the contour points of the three-dimensional homology model 140 are aligned with only the convexity defects between the toes as illustrated in FIG. 16A and do not spread out to tiptoes. The foot shape model obtained in such a manner is smaller than the actual foot. When selecting shoes or creating a shoe type, based on such a foot shape, there is a possibility that the shoes become smaller than the actual foot.

For this reason, the convex hull processor 74 of the model generator 66 performs, on the contour, convex hull processing of omitting the convexity defects each corresponding to the shape between the toes in the contour that has been detected from the foot image. The convex hull processing is a process of calculating a minimum convex polygon including all of a plurality of given points. As the convex hull processing, for example, an existing program module that is publicly opened in OpenCV may be used. FIG. 16B illustrates the foot contour 142, which has been calculated as the minimum convex polygon in which the convexity defects between the toes are omitted.

The optimization processor 76 of the model generator 66 adds, to the three-dimensional homology model 140, deformation that brings the three-dimensional homology model 140 as close as possible to the foot contour that has been subjected to the convex hull processing, and thus generates a three-dimensional model of the detected foot. More specifically, the optimization processor 76 moves the contour of the three-dimensional homology model 140 toward the detected contour to reach a position that minimizes a total sum of positional differences between the contour points defined in the three-dimensional homology model 140 and the detected points included in the contour that have been detected from the foot image. A positional difference between a contour point of the three-dimensional homology model 140 and a detected point of the contour from the foot image is expressed by the following expression A.

The total sum of the positional differences=$\Sigma$ {W$_i$ (detected point j−contour point i)} . . . Expression A W$_i$=weight, $1 \leq i \leq 295$, $1 \leq j \leq$ maximum value of the number of detected points The model generator 66 deforms the three-dimensional homology model 140 to minimize the positional difference calculated by the above expression A, and thus causes the three-dimensional homology model 140 to be in close proximity to the detected contour. By limiting the contour points in the three-dimensional homology model 140 to 295 points and defining the contour points beforehand, it is possible to suppress an increase in search processing of close proximity points and to speed up calculation processing. In addition, by performing the convex hull processing on the foot contour beforehand, it is possible to enhance the measurement accuracy in the size measurement for selecting shoes and the foot shape measurement for a shoe type.

Figure 17:
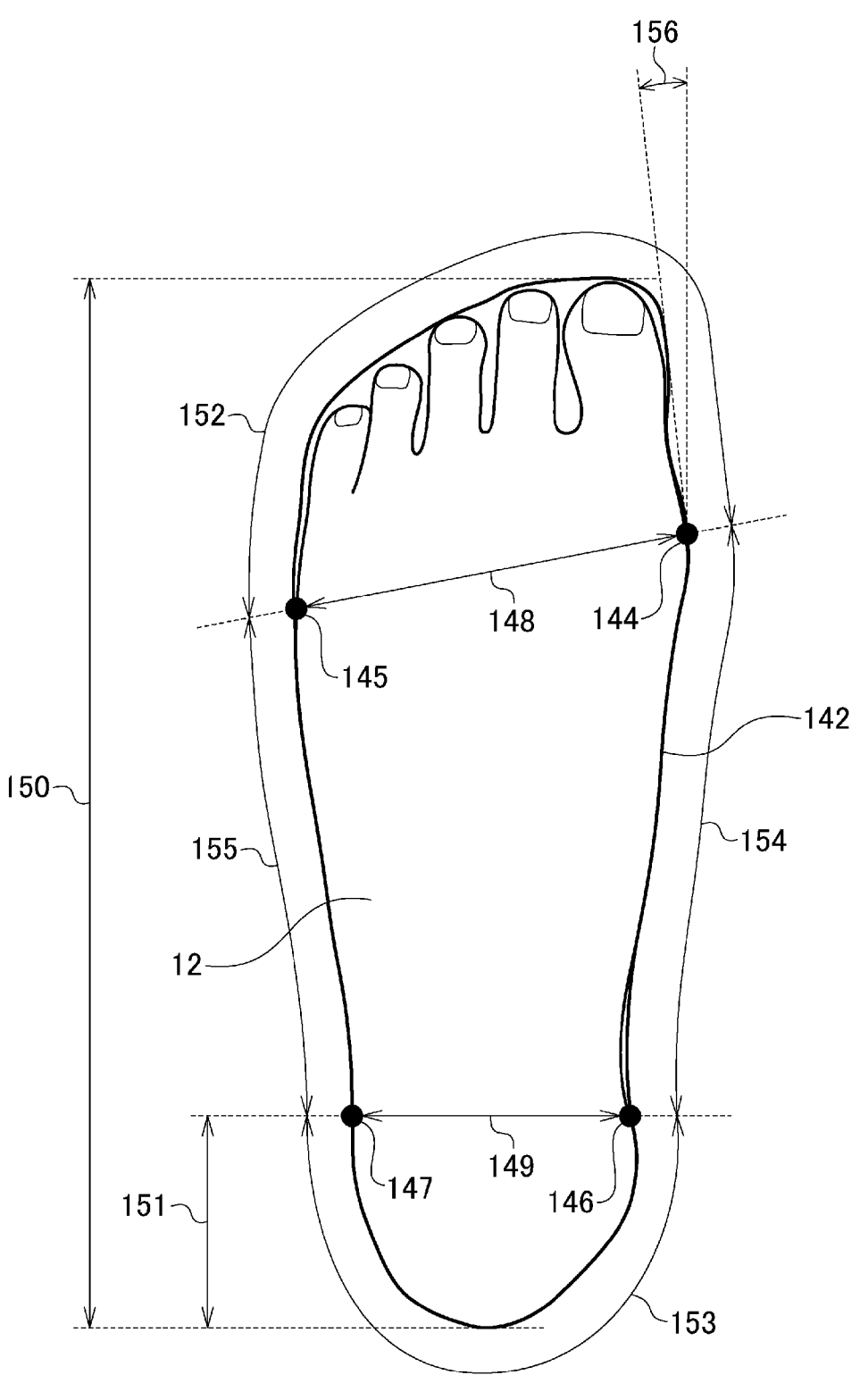
FIG. 17 is a diagram illustrating a plurality of characteristic detected points included in a foot contour.

FIG. 17 illustrates a plurality of characteristic detected points included in the foot contour 142. A first foot width end point 144 is also called a Matatarsal Tibiale (MT) point, and corresponds to a vertex protruding most on an inner foot side in a lateral width of metatarsal bones. A second foot width end point 145 is also called a Matatarsal Fibulare (MF) point, and corresponds to a vertex protruding most on an outer foot side in the lateral width of the metatarsal bones. A foot width 148 denotes a line connecting the first foot width end point 144 and the second foot width end point 145. In addition, a foot circumference denotes a length of a circumference in the lateral width of one foot 12 passing through the first foot width end point 144 and the second foot width end point 145. An angle formed by an imaginary line in a foot length direction that starts from the first foot width end point 144 and an imaginary straight line in contact with a lateral surface on the inner foot side of the first toe (thumb) denotes a first toe side angle 156, and whether the subject has hallux valgus can be diagnosed depending on the size of the first toe side angle 156. A first heel width end point 146 and a second heel width end point 147 respectively correspond to end points of a heel width 149. The heel width 149 denotes a length in a foot width direction at a position of about 17% a foot length 150 (a position corresponding to the length of a heel part 151 from a heel side end point in the foot length).

In the foot contour 142 that has been detected from one foot 12 and that has been subjected to the convex hull processing, a first section 152 from the first foot width end point 144, which serves as a reference when the foot width and the foot circumference are measured, to the second foot width end point 145, which passes through the contour on a toe side, is a part in which individual differences are considered to be relatively large particularly in its shape, size, and length. In addition, in the foot contour 142, a second section 153 from the first heel width end point 146, which serves as a reference for measuring the heel width 149, to the second heel width end point 147, which passes through the contour on a heel side, is also a part in which individual differences are considered to be relatively large particularly in its shape, size, and length. On the other hand, a third section 154, which corresponds to the contour on the inner foot side from the first foot width end point 144 to the first heel width end point 146, and a fourth section 155, which corresponds to the contour on the outer foot side from the second foot width end point 145 to the second heel width end point 147, are parts in which individual differences are considered to be relatively smaller than those of the first section 152 and the second section 153.

Accordingly, a predetermined number of contour points defined in the three-dimensional homology model 140 are defined such that space between the contour points in the third section 154 and the fourth section 155 is wider than space between the contour points in the first section 152 and the second section 153. That is to say, the contour points in the first section 152 and the second section 153 are set to have relatively dense space between them, and the contour points in the third section 154 and the fourth section 155 are set to have relatively loose space between them. The contour points in the second section 153 and the third section 154 are thinned out in this manner, so that the contour points in the parts of relatively low importance in the measurement of various sizes of the foot can be reduced, and the calculation time for aligning the three-dimensional homology model 140 with the foot contour can be reduced.

The contour of the foot in the three-dimensional homology model 140 includes a plurality of points to be measured that are points to be measured as predetermined part sizes. The plurality of points to be measured mentioned here include, for example, the first foot width end point 144, the second foot width end point 145, the first heel width end point 146, and the second heel width end point 147, which have been described above. From among a predetermined number of contour points in the three-dimensional homology model 140, the optimization processor 76 brings a contour point in closer proximity to a plurality of points to be measured on a priority basis so that a positional difference from the detected point becomes smaller. More specifically, for contour points closer to the first foot width end point 144, the second foot width end point 145, the first heel width end point 146, and the second heel width end point 147, a larger weighting value $W_i$ in the expression A is given. For contour points farther from them, a smaller weighting value $W_i$ is given. For example, when IDs of the contour points close to the points to be measured are "100", "101", "102", and "103", the values of $W_{100}$, $W_{101}$, $W_{102}$, $W_{103}$, and $W_{104}$ are set to "10", and all the values of $W_i$ of the other contour points are set to "1".

Figure 18:
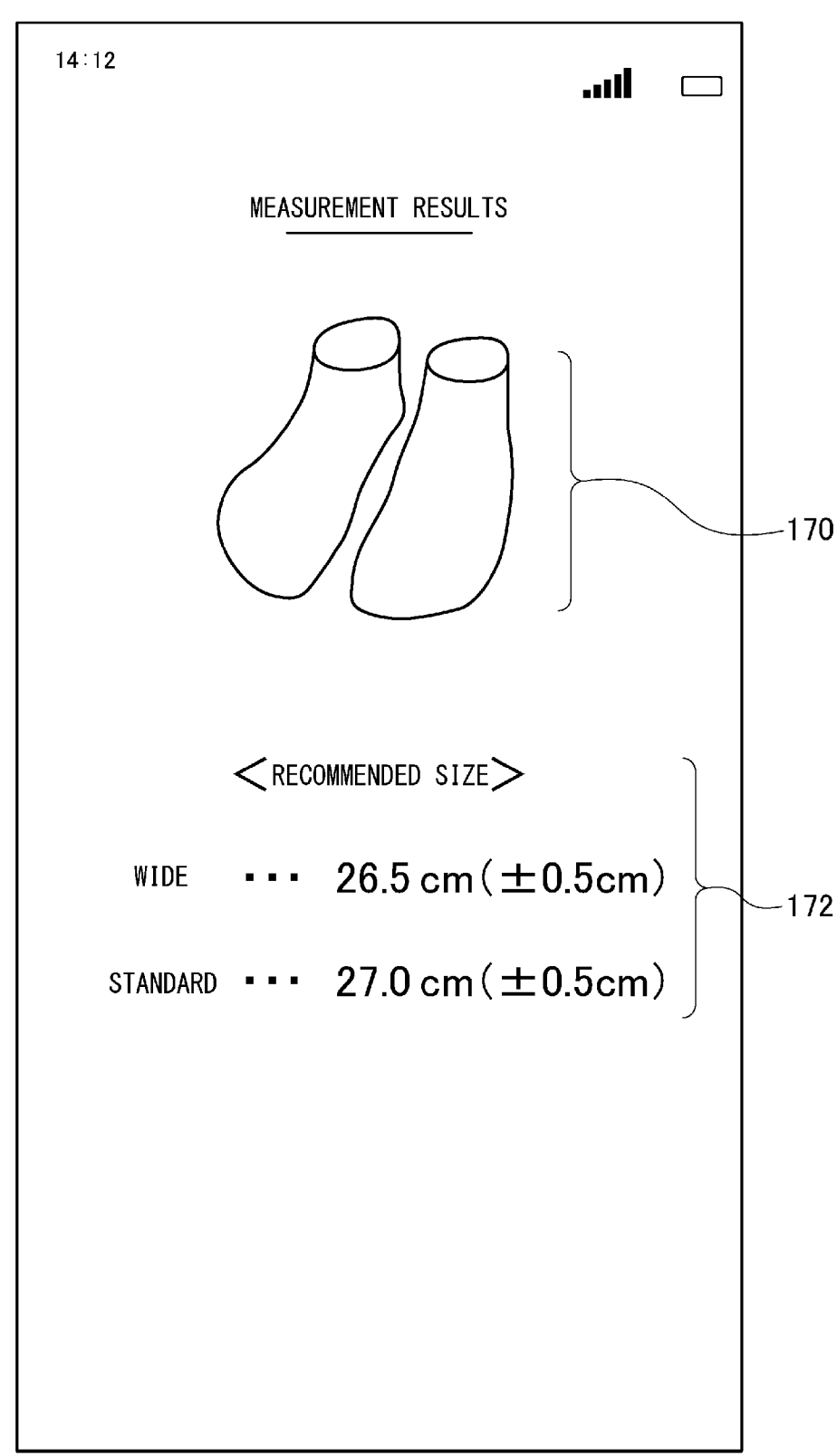
FIG. 18 is a diagram illustrating a screen example of outputting a three-dimensional model of a foot shape and a measurement result.

FIG. 18 illustrates a screen example of outputting a three-dimensional model of the foot shape and measurement results. The result outputter 47 displays a three-dimensional model 170 and a foot size 172 on the screen under the control of the display controller 46. The three-dimensional model 170 is an image obtained by rendering a three-dimensional model of one foot 12 of the subject 11 that has been generated by the model generator 45 and the model generator 66. The foot size 172 is a recommended size of shoes. In addition, the measurement results of a foot length, a foot width, a foot circumference, a heel width, a first toe side angle, an arch height, a foot instep height, or the like may be displayed.

Second Embodiment

In a second embodiment, after the tilt adjustment step is performed, the alignment step of an imaging viewpoint is performed. This is different from the first embodiment in which after the alignment step of the imaging viewpoint is performed, the tilt adjustment step is performed. In addition, descriptions of common points to the first embodiment will be omitted, and differences from the first embodiment will be mainly described below.

Figure 19:
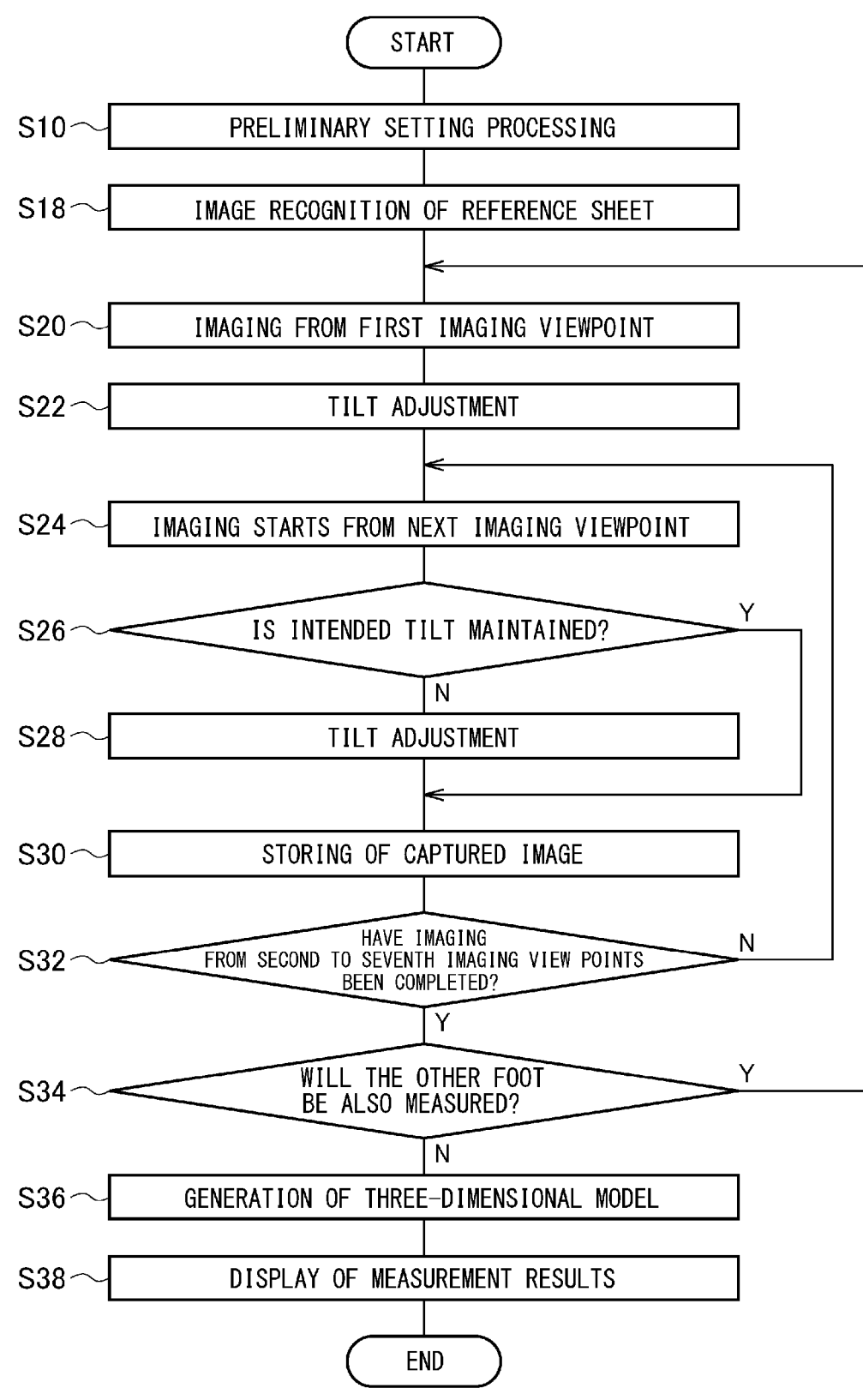
FIG. 19 is a flowchart illustrating a process of foot shape measurement in a second embodiment.

FIG. 19 is a flowchart illustrating a step of foot shape measurement in the second embodiment. First, preliminary setting processing is performed (S10). The preliminary setting processing includes, for example, setting of a measurement mode, setting of subject information, display of a tutorial, and setting of either a right foot or a left foot is measured first. The measurement mode in the present embodiment includes a child measurement mode, in addition to the self-imaging mode and another person's cooperative imaging mode, and any one of these modes is selected. As the subject information, for example, information of name, age, gender, and the like of the subject 11 is input. As the tutorial, an animation for explaining the procedure of the foot shape measurement is displayed.

Next, similarly to FIG. 5 in the first embodiment, the reference sheet 20 is imaged to perform image recognition (S18). Next, similarly to FIG. 7 in the first embodiment, the foot is imaged from directly above as the first imaging direction (S20). The above steps of S10 to S20 may be steps performed similarly in the first embodiment.

The second embodiment is different from the first embodiment in that the tilt adjustment processing is performed before imaging from the second to seventh imaging viewpoints. That is, before moving to the imaging viewpoint, in the tilt adjustment step, the tilt angle of the user terminal 10 is adjusted to an intended tilt angle (S22), and the foot is imaged from the second to seventh imaging viewpoints while maintaining such a tilt angle.

Imaging from any of the second to seventh imaging viewpoints is started, while the tilt angle of the user terminal 10 is being maintained (S24). Here, in a case where the tilt angle of the user terminal 10 is not maintained within a predetermined range around the intended tilt angle (N in S26), the adjustment step of the tilt angle is performed similarly to FIG. 10 in the first embodiment (S28), and in a case where the tilt angle of the user terminal 10 is maintained within the predetermined range around the intended tilt angle (Y in S26), S28 is skipped.

When the user terminal 10 is moved to any of the imaging viewpoints, the viewpoint state mark and the viewpoint target mark are aligned with each other similarly to FIG. 9 in the first embodiment, and the user terminal 10 stands still for a predetermined time similarly to FIGS. 11 and 12 in the first embodiment, an image is captured and stored as a foot image (S30). Note that although not illustrated, the measurement step can be stopped at any timing of S18 to S34, or one foot can be measured again by returning to S18 or S20.

The imaging processing in S24 to S30 as described above is repeated for the second to seventh imaging viewpoints until it is completed (N in S32). When the imaging processing is completed, the processing proceeds to S34 (Y in S32). When a screen for indicating that the imaging of one foot is completed and for asking the user about whether to proceed to imaging of the other foot is displayed, and the user selects proceeding to imaging of the other foot (Y in S34), the processing returns to S20, and the imaging processing in S20 to S32 is performed for the other foot. In a case where the user has ended with the imaging of only one foot and has selected not to proceed to the imaging of the other foot (N in S34), the process proceeds to S36. Examples of the case where the user has ended with the imaging of only one foot include a case where the user determines that it is sufficient to measure only one foot (for example, in a case where the user does not have an enough time for the measurement, in a case where the user is unwilling to measure both feet, and in a case where the user originally desires to know the size of only one foot), and a case where it is possible to measure only one foot (for example, in a case where it is possible for the subject to measure only one foot because of a loss or defect in the other foot or injury). Note that steps S20 to S32 are repeated twice, and also when imaging and the measurement of both feet are completed, the processing proceeds to S36 (N in S34). In S36, a three-dimensional model of the foot shape is generated (S36), and is displayed on the screen together with the measurement results and the recommended size in a similar manner to FIG. 18 in the first embodiment (S38). Note that in the case where only one foot is imaged and measured, and end is selected in S34, the three-dimensional model of one foot is generated in S36, and the measurement results of one foot and the recommended size based on the measurement results of one foot are displayed in S38.

Figure 20:
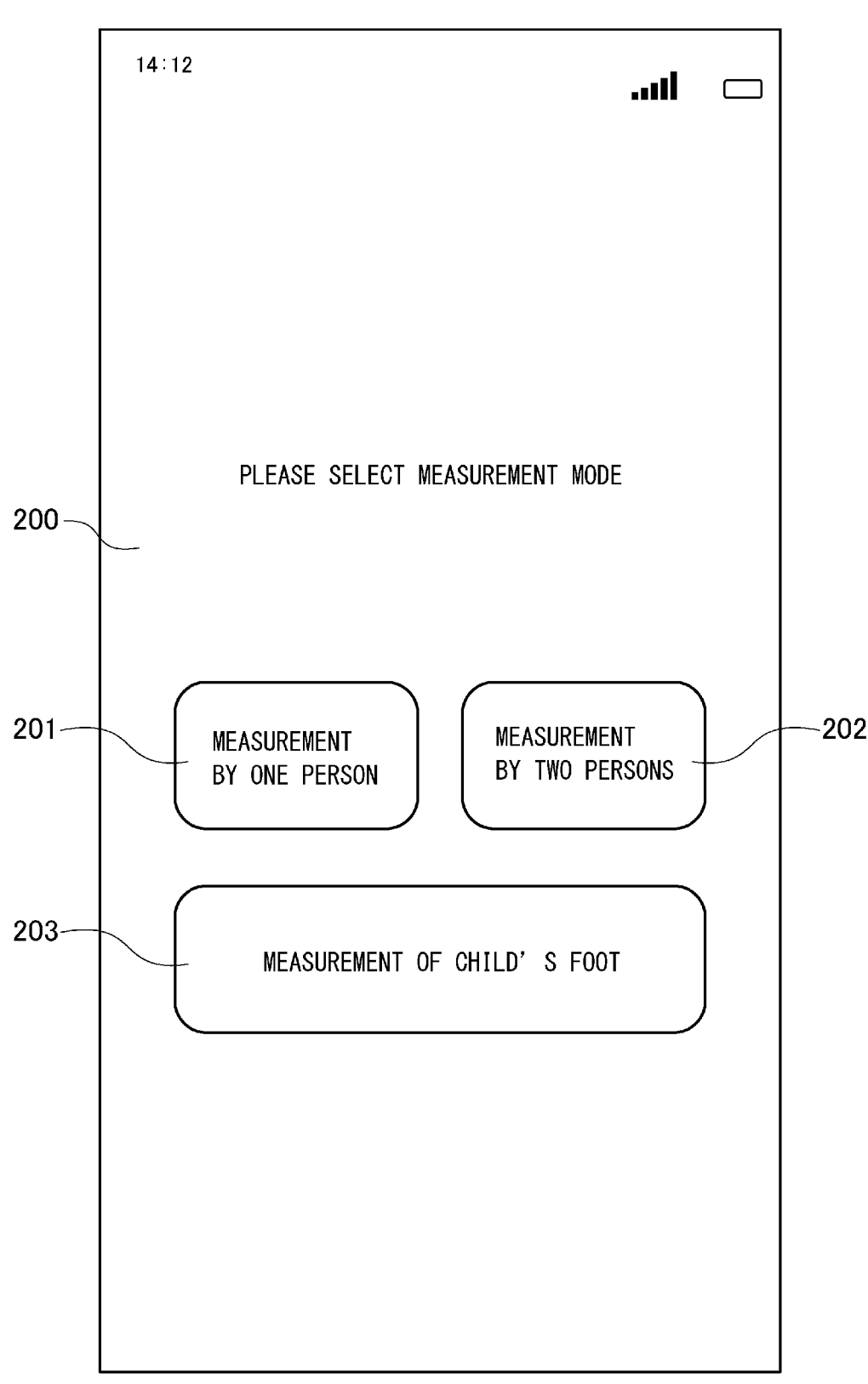
FIG. 20 is a diagram illustrating an example of a measurement mode selection screen in the second embodiment.

FIG. 20 illustrates an example of a measurement mode selection screen in the second embodiment. A measurement mode selection screen 200 is displayed as the preliminary setting processing illustrated in S10 of FIG. 19. On the measurement mode selection screen 200, a first button 201, a second button 202, and a third button 203 are displayed. In a case of selecting the self-imaging mode in which the subject 11 himself/herself images one foot 12 of the subject 11 (a mode in which the measurement is conducted by one person), the first button 201 is pressed. In a case of selecting another person's cooperative imaging mode in which another person images one foot 12 of the subject 11, instead of the subject 11 (a mode in which the measurement is conducted by two persons), the second button 202 is pressed. In a case of selecting a child measurement mode in which a parent measures a small child's foot, the third button 203 is pressed.

The child measurement mode is a mode in which the presentation of recommended shoes is finally given to the parent, and thus the child measurement mode is distinguished from the self-imaging mode and another person's cooperative imaging mode. However, the basic measurement step is as illustrated in FIG. 19.

FIG. 21 illustrates a one foot selection screen in the second embodiment. A one foot selection screen 214 is one of the preliminary setting processing illustrated in S10 of FIG. 19, and is a screen for selecting either a right foot or a left foot is to be measured. On the one foot selection screen 214, in a case of selecting a left foot image 216, the left foot is set to be measured, and in a case of selecting the right foot image 217, the right foot is set to be measured.

A setting button 215 is displayed on the upper left of the one foot selection screen 214. When the setting button 215 is pressed, the screen shifts to a predetermined setting screen, not illustrated. On the setting screen, for example, it is possible to set a distance connecting an intended imaging viewpoint and a foot and an angle between them. Regarding a combination of the distance and the angle of the imaging viewpoint, a plurality of presets including, for example, "100 centimeters" and "30 degrees" are prepared beforehand. By selecting a preset, it is possible to set the combination. In addition, a different preset may be automatically selected as initial settings in accordance with which one of the self-imaging mode, another person's cooperative imaging mode, and the child measurement mode has been selected or in accordance with the subject information. For example, in the self-imaging mode, as the imaging viewpoint is closer to the floor surface, the subject himself/herself has to bend down to be low, resulting in a constrained posture. In particular, as the height of the subject is higher, the constraint of the posture tends to be more remarkable. Accordingly, in the case of the self-imaging mode, the imaging viewpoint may be set such that as the height of the subject is higher, the distance of the imaging viewpoint becomes longer and the angle with the body axis becomes shallower.

In addition, in the case of the child measurement mode, as the subject is a smaller child, the distance between the wearing clothes and the floor surface is shorter. Therefore, in a case where the angle between the imaging viewpoint and the body axis is shallow, the foot is hidden by the clothes and imaging may not be enabled. Accordingly, as the height of the subject is shorter, the angle of the imaging viewpoint may be set to be deeper and lower.

Figure 22:
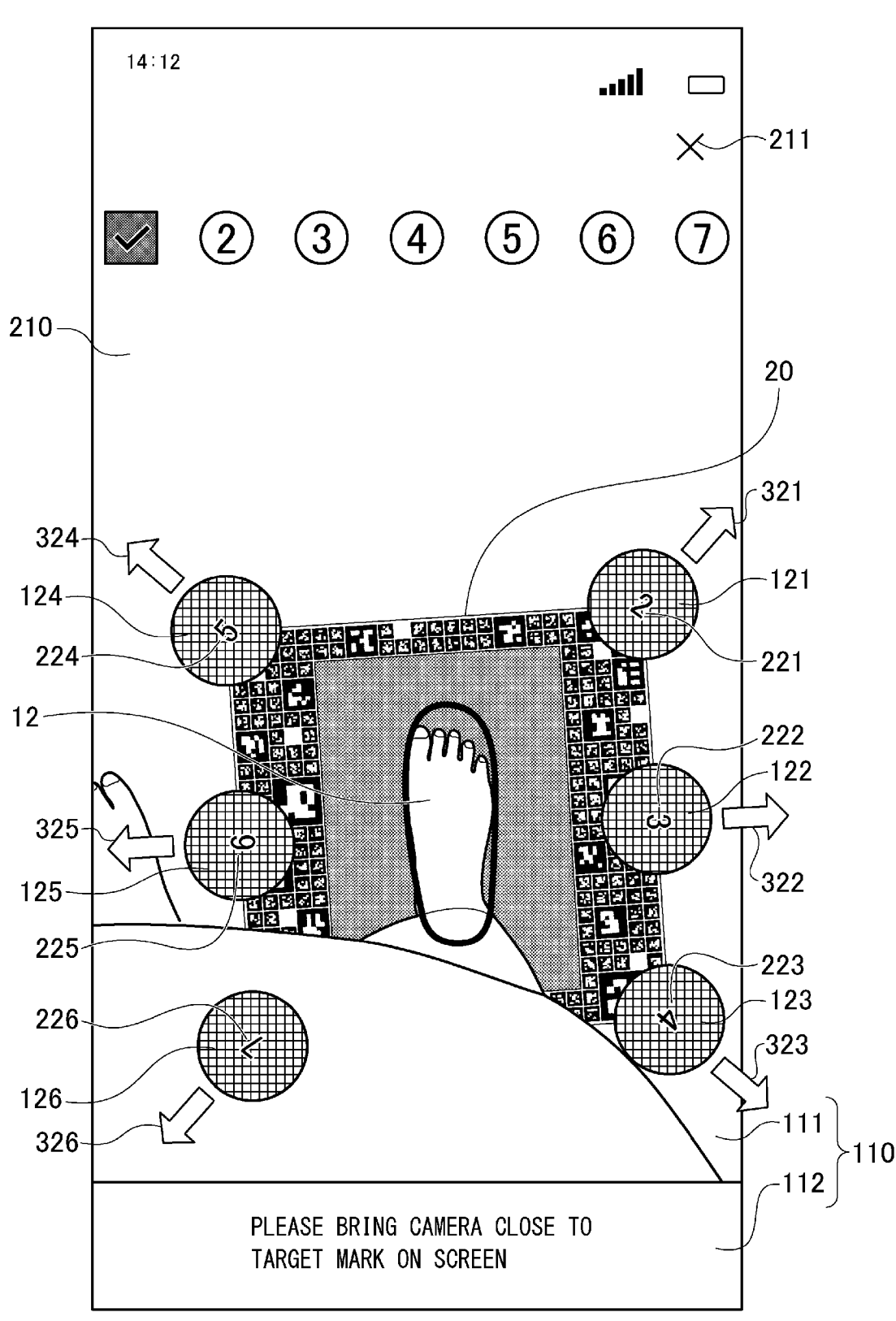
FIG. 22 is a diagram illustrating a first screen example at the start of imaging in the second to seventh imaging viewpoints in the second embodiment.

FIG. 22 illustrates a first screen example at the start of imaging in the second to seventh imaging viewpoints in the second embodiment. An imaging start screen 210 is a screen displayed at an imaging start time point (S24 in FIG. 19) in the second to seventh imaging viewpoints, and is a modified screen example of FIG. 8 in the first embodiment. That is to say, first to sixth viewpoint target numbers 221 to 226 respectively included in the first to sixth viewpoint target marks 121 to 126 are displayed such that each number is displayed to be perpendicular when viewed from the subject 11 with one foot 12 of the subject 11 placed at the center of the reference sheet 20. This is different from the screen example of FIG. 8. Note that in another person's cooperative imaging mode or the child measurement mode, the first to sixth viewpoint target numbers 221 to 226 may be displayed in a direction turned upside down from the numbers in FIG. 22. After being displayed for about one second in the state of the screen example of FIG. 22, the first to sixth viewpoint target marks 121 to 126 respectively move to the first to sixth direction 321 to 326, which are radiated from one foot 12 placed at the center of the reference sheet 20, and straight broken lines (to be illustrated in the next drawing) are displayed along their movement trajectories.

Note that in the following screen examples, a close button 211 is displayed at an upper right end on the screen. When the user presses the close button 211, a button for selecting stop of the measurement step or restart of the measurement of one foot from the beginning is displayed, and either one is selectable. For example, in a case of making a mistake like a movement of the foot at the time of measurement, it is not possible to measure the foot with appropriate accuracy, even though the measurement is forcibly advanced to the final step. In addition, in a case of the failure in the measurement of one foot, a method in which both feet have to be measured again from the beginning is annoying. Therefore, in the second embodiment, it is possible to stop the measurement at any time while conducting the measurement, and in addition, in a case of having stopped the measurement in the middle, it is possible to measure only the foot, the measurement of which has not been completed, again from the beginning.

Figure 23:
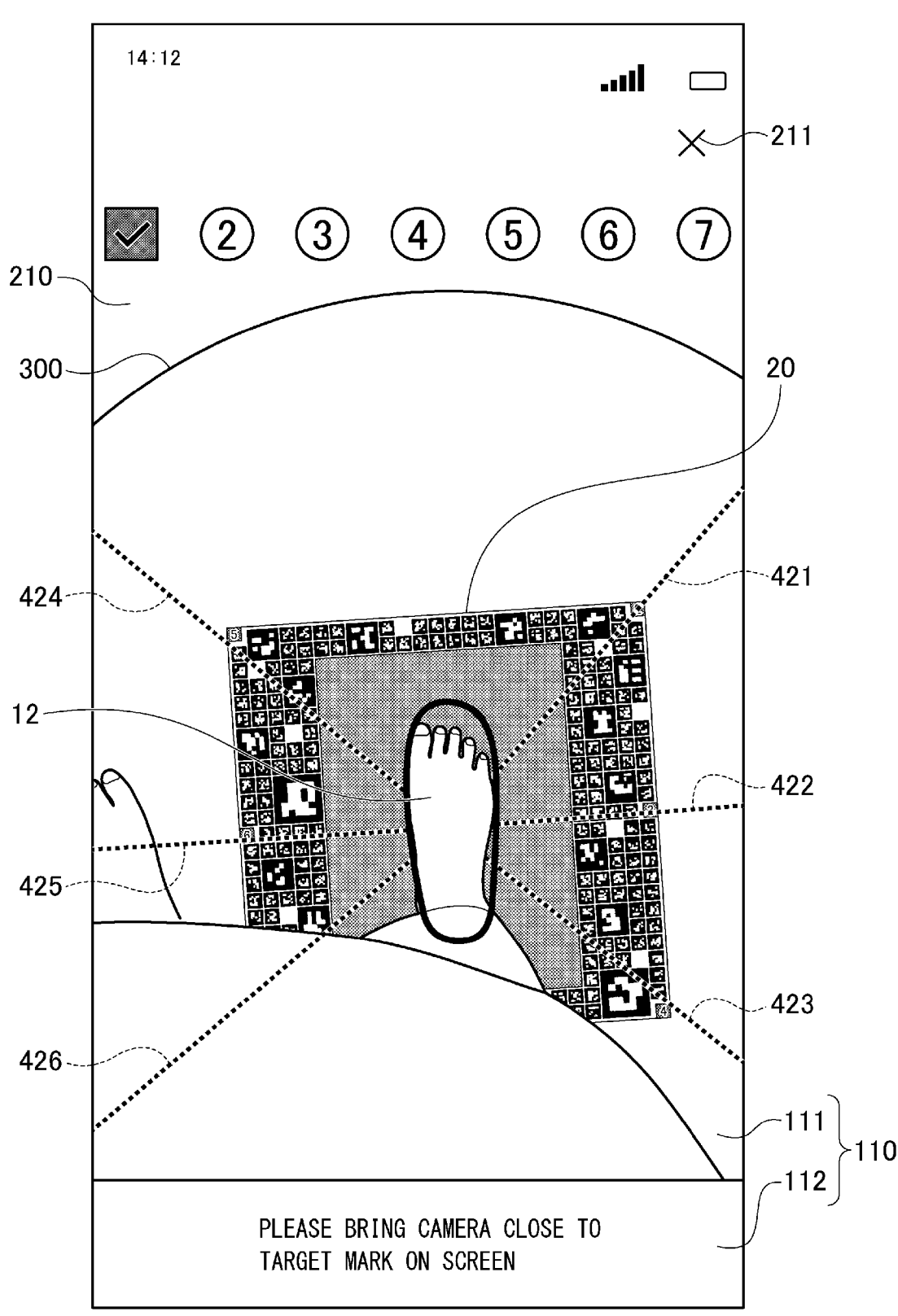
FIG. 23 is a diagram illustrating a second screen example at the start of imaging in the second to seventh imaging viewpoints in the second embodiment.

FIG. 23 illustrates a second screen example at the start of imaging in the second to seventh imaging viewpoints in the second embodiment. From the state of FIG. 22, the first to sixth target lines 421 to 426, each of which is in a broken line shape, are displayed along trajectories in which the first to sixth viewpoint target marks 121 to 126 move in the first to sixth directions 321 to 326, each of which is in a radial line shape. An annular line 300 is a line that annularly connects the first to sixth viewpoint target marks 121 to 126, which have moved to positions outside the screen in the drawing. By displaying the annular line 300 and the first to sixth target lines 421 to 426, it becomes easy to grasp in which directions the first to sixth viewpoint target mark 121 to 126 are arranged, even though the first to sixth viewpoint target marks have moved to the outside of the screen.

Figure 24:
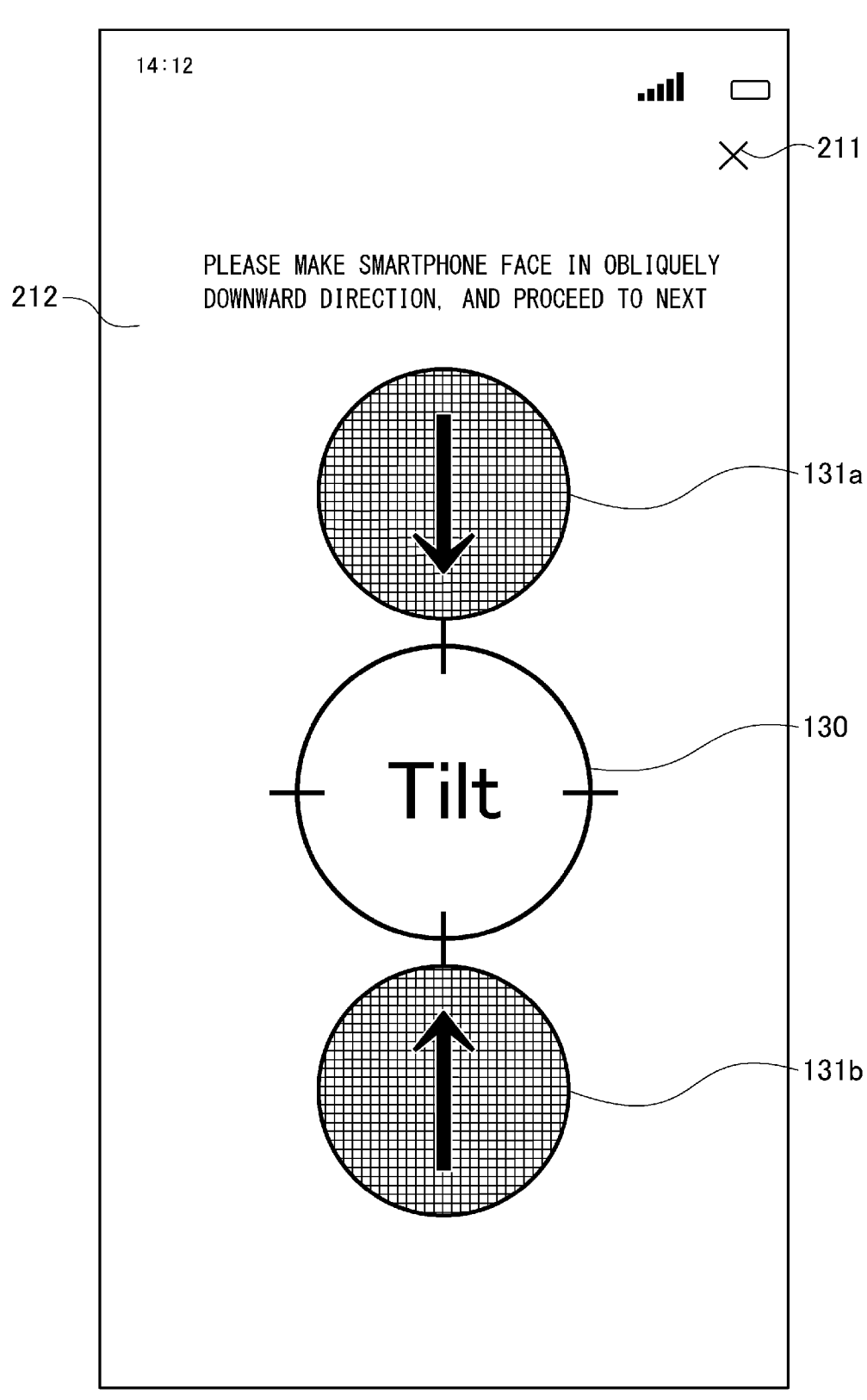
FIG. 24 is a diagram illustrating a screen example of a tilt adjustment step in the second embodiment.

FIG. 24 illustrates a screen example of a tilt adjustment step in the second embodiment. After the screen of FIG. 23 is displayed, the screen is changed to a screen with a monochromatic background as FIG. 24, and the tilt target mark 130 and the pair of tilt state marks 131*a* and 131*b* are displayed in a similar manner to FIG. 10 in the first embodiment. Note that although no live view video being captured is displayed with the background as a monochromatic background, the camera of the user terminal 10 remains activated only by making the live view video invisible, and the imaging state is continuing. In addition, in the tilt target mark 130 in the second embodiment, a character string for instructing the user to tilt the user terminal 10 like "Tilt" is displayed at the center. However, similarly to the first embodiment, the difference between the current tilt angle of the user terminal 10 and the intended tilt angle may be displayed in numerals.

As illustrated in FIG. 24, the reason why the live view video being captured is made invisible and the tilt target mark 130 and the pair of tilt state marks 131*a* and 131*b* are displayed is to make the user concentrate on the adjustment of the tilt. The first to sixth viewpoint target marks 121 to 126 are not displayed while the tilt adjustment screen 212 is being displayed. Therefore, it is possible to make it easy to visually and intuitively understand that the current step is a step of adjusting the tilt angle to an intended one, instead of the alignment of the imaging viewpoint. In addition, in the step of aligning the imaging viewpoint with the target viewpoint, it is sufficient to simply move the angle of view upward, downward, leftward, or rightward, whereas the step of adjusting the tilt angle to the intended one necessitates, in general, a slightly unfamiliar, unaccustomed operation of tilting the user terminal 10 in accordance with a predetermined tilt axis. Therefore, it is considered that the operation is easier and more efficient to conduct the tilt adjustment only once at first for practice and move around the subject 11 circularly while maintaining the tilt angle after the tilt angle is determined so as to adjust the imaging viewpoint to each target viewpoint than to conduct the tilt adjustment every time for every imaging viewpoint as in the first embodiment. That is, as long as the initially adjusted tilt angle is maintained, the adjustment of the tilt angle for every imaging viewpoint is no longer necessary, and the measurement can be easily conducted for a shorter time.

Figure 25:
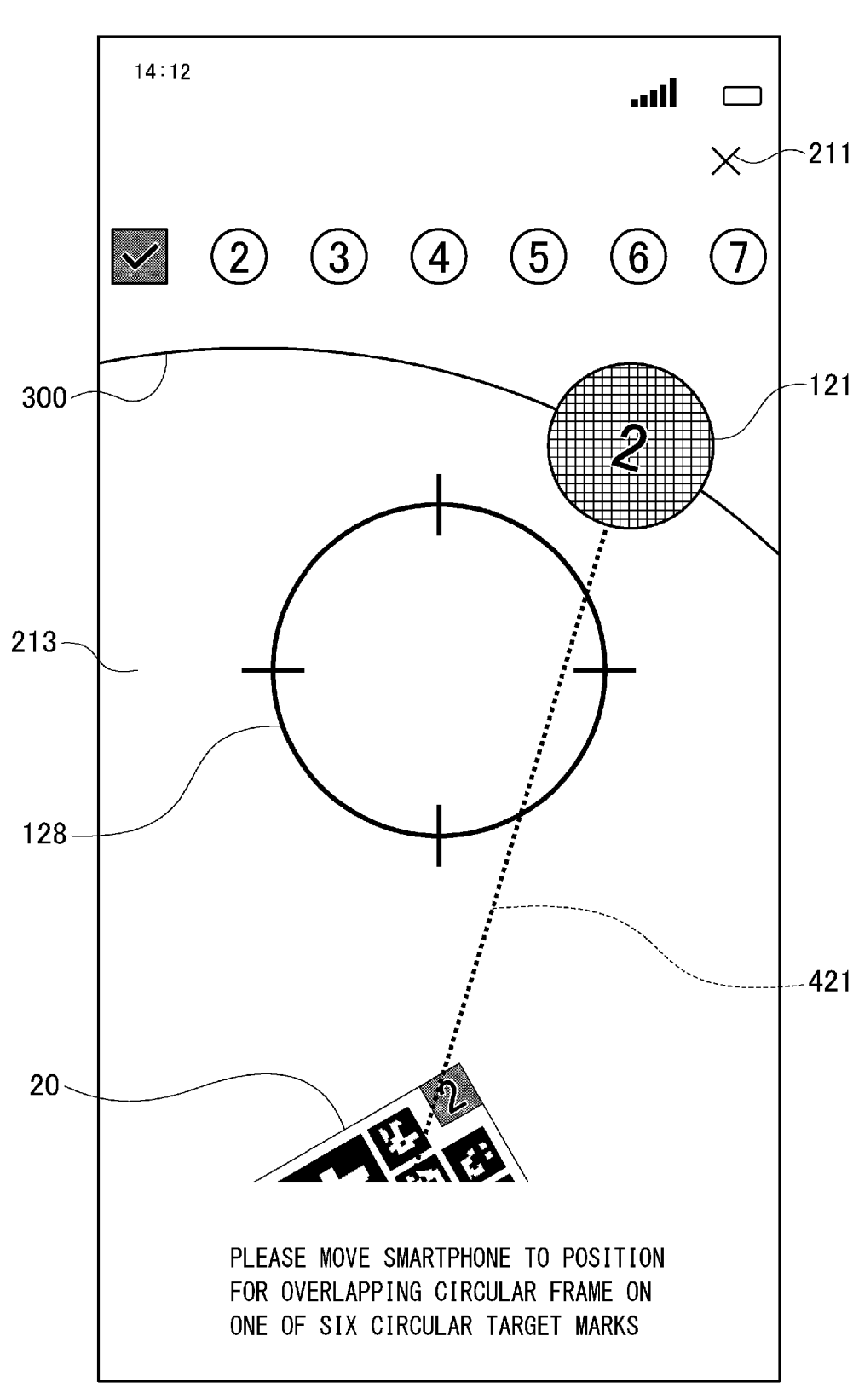
FIG. 25 is a diagram illustrating a screen example of an alignment step of the second imaging viewpoint in the second embodiment.

FIG. 25 illustrates a screen example of an alignment step of a second imaging viewpoint in the second embodiment. Similarly to FIG. 9 in the first embodiment, an imaging viewpoint adjustment screen 213 illustrates a step of aligning the viewpoint state mark 128 with the first viewpoint target mark 121. What is different from FIG. 9 in the first embodiment is that the first viewpoint target mark 121 is displayed in a position along the annular line 300, and in addition, a first target line 421 in a broken line shape that connects the vicinity of the center of the reference sheet 20 and the first viewpoint target mark 121 is displayed. When the user brings the imaging viewpoint of the imaging unit 40 closer to the first viewpoint target mark 121, the position and the display size of the first viewpoint target mark 121 get closer to the position and the display size of the viewpoint state mark 128. When the user brings the imaging viewpoint of the imaging unit 40 closer to the first viewpoint target mark 121, the user terminal 10 vibrates by means of a haptic technology at an intensity or a vibration frequency in accordance with closeness between the positions and the display sizes of the viewpoint state mark 128 and the first viewpoint target mark 121.

Figure 26:
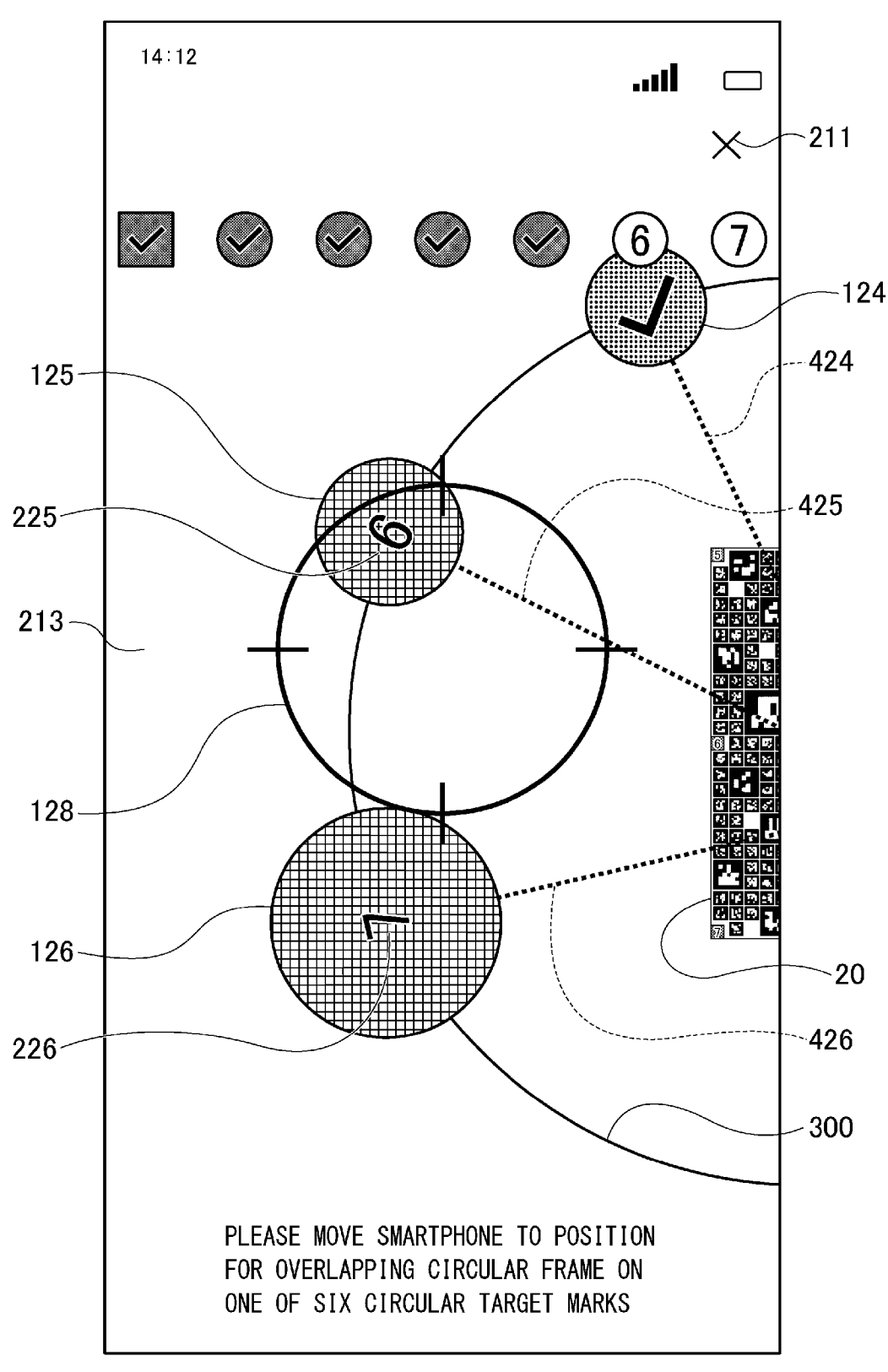
FIG. 26 is a diagram illustrating a screen example of the alignment step of the fifth to seventh imaging viewpoints in the second embodiment.

FIG. 26 is a diagram illustrating a screen example of an alignment step of the fifth to seventh imaging viewpoints in the second embodiment. The fourth viewpoint target mark 124 for indicating the fifth imaging viewpoint is displayed with a check mark indicating that imaging has already been done. Regarding the fifth viewpoint target mark 125 and the sixth viewpoint target mark 126, imaging has not been done, a fifth viewpoint target number 225 and a sixth viewpoint target number 226 are displayed. The fourth to sixth viewpoint target marks 124 to 126 are displayed to be connected with the vicinity of the center of the reference sheet 20 respectively by the fifth to seventh target lines 424 to 426, each of which is in a broken line shape.

Figure 27:
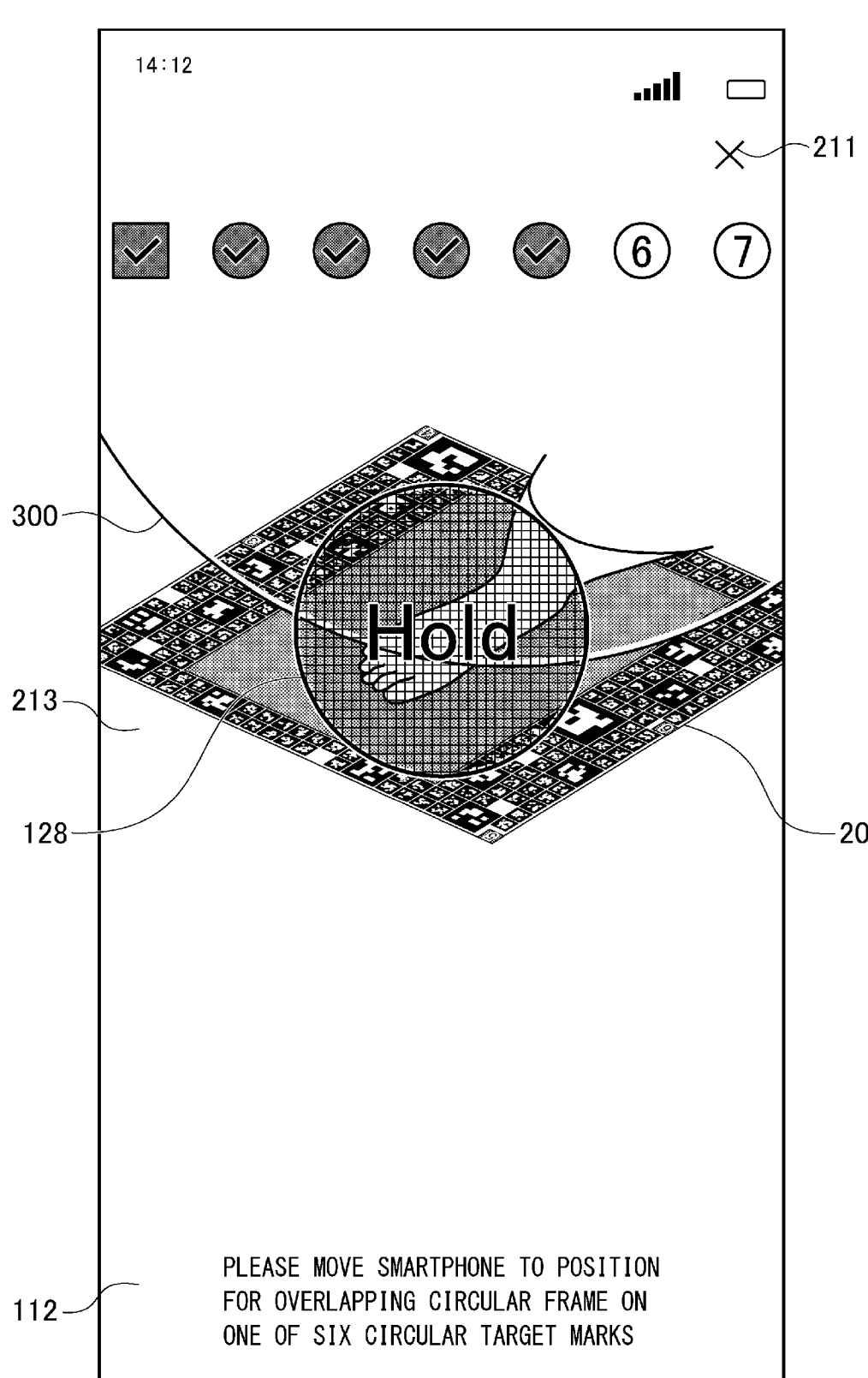
FIG. 27 is a diagram illustrating a screen example for instructing the imaging unit to stand still in the second embodiment.

FIG. 27 illustrates a screen example for instructing the imaging unit 40 to stand still in the second embodiment.

When the viewpoint state mark 128 is in a state of being aligned with any of the first to sixth viewpoint target marks 121 to 126, the imaging viewpoint adjustment screen 213 as illustrated in FIG. 27 is displayed to prompt the user to stop tilting the imaging unit 40 by displaying the characters "Hold" inside the viewpoint state mark 128 and the characters "Please stand still in this state" in the character area 112. At this timing, the viewpoint state mark 128 is drawn as a translucently colored circle, so that one foot 12 behind the viewpoint state mark 128 is made visible in a transparent manner. Accordingly, even though the viewpoint state mark 128 is superimposed, it is possible to visually recognize whether one foot 12 of the subject 11 is moving or not, while the position of the user terminal 10 is stationary. In particular, in a case where the subject 11 is a child, it is effective to check whether the subject is moving one foot 12 or not.

In a case where the imaging viewpoint is maintained in a stationary state for a predetermined time, as illustrated in FIG. 12 in the first embodiment, a screen of completion of acquisition of the foot image is displayed, and in addition, a sound output for indicating the completion of imaging in such an imaging viewpoint and a short vibration of the user terminal 10 for indicating the completion by means of the haptic technology are conducted. With the sound output and the vibration by means of the haptics technology, it is possible to easily grasp the completion of imaging also in the imaging viewpoint in which it is less likely to visually recognize the screen content. In particular, also in an environment where the sound output is refrained or a person with impaired hearing, it is possible to easily grasp the completion of imaging from the vibration by means of haptics technology.

Note that in a case where the tilt angle of the user terminal 10 is not maintained within the predetermined range around the intended tilt angle on the imaging viewpoint adjustment screen 213 (N in S26 in FIG. 19), the adjustment step of the tilt angle is performed similarly to FIG. 10 in the first embodiment (S28 in FIG. 19).

In a modification, instead of the reference sheet 20, by imaging a predetermined object, the size and shape of which are determined beforehand, as a reference together with the foot, the position coordinates and the reference length in the augmented reality space may be detected. The reference object as an alternative to the reference sheet 20 may be, for example, a sheet of paper having a prescribed size such as A4 or a letter size, or a sheet of paper having a fixed size such as paper money. Alternatively, without being limited to a quadrangular shape, a sheet of paper having a predetermined shape by which its shape is easily recognized, such as a circular shape, may be adoptable.

In another modification, instead of seven imaging viewpoints, the specification may be configured such that the number of imaging viewpoints is reduced, for example, three imaging viewpoints, and the size of the foot is measured from the three foot images. In this case, although there is a possibility that the measurement accuracy is inferior to that in the case of imaging from seven imaging viewpoints, it is advantageous in that the imaging procedure can be simplified and the size of the foot can be simply measured for a shorter time.

The present invention is not limited to the above-described embodiments, and each configuration can be appropriately changed without departing from the gist of the present invention. In addition, the following aspects can be obtained by generalizing the above-described embodiments.

First Aspect

A foot shape measurement apparatus including:
an imaging unit;
a space setter structured to set an augmented reality space, based on an image captured by the imaging unit;
a display controller structured to display, on a screen, the image captured by the imaging unit and a guide object to be arranged in the augmented reality space and to guide an imaging procedure;
an image acquisition unit structured to acquire a plurality of foot images that have been captured by the imaging unit imaging a foot of a subject from a plurality of angles;
a model generator structured to generate a three-dimensional model of the foot of the subject, based on the plurality of foot images; and
a result outputter structured to output a measurement result based on the three-dimensional model that has been generated, in which
the display controller displays, as the guide object, a target mark and a state mark to be superimposed on a visual being captured by the imaging unit, the target mark indicating a viewpoint position in which an imaging viewpoint by the imaging unit in the augmented reality space forms a predetermined angle to the foot of the subject, the state mark indicating a current state of the imaging viewpoint by the imaging unit in the augmented reality space, and
the image acquisition unit acquires, as the foot image that has been captured from the predetermined angle, the image to be captured when the imaging viewpoint by the imaging unit in the augmented reality space is present in the imaging viewpoint by which a display state of the target mark and a display state of the state mark each satisfy a predetermined condition.

Second Aspect

The foot shape measurement apparatus described in the first aspect, in which
the target mark includes a first target mark and a second target mark, the first target mark indicating a target of a position of the imaging viewpoint that satisfies the predetermined condition by at least one of a position and a size of a mark, the second target mark indicating a target of a tilt angle of the imaging unit from the imaging viewpoint that satisfies the predetermined condition by a position of a mark,
the state mark includes a first state mark and a second state mark, the first state mark indicating at least a position of a current imaging viewpoint by the imaging unit in the augmented reality space, the second state mark indicating the tilt angle of the imaging unit from the current imaging viewpoint by the imaging unit in the augmented reality space by a position of a mark, and
while the first target mark and the first state mark are displayed in the augmented reality space, when an operator makes an operation for moving the position of the imaging unit and positions and sizes of the first state mark and the first target mark overlap with each other, the display controller indicates that the position of the current imaging viewpoint is present in the imaging viewpoint that satisfies the predetermined condition, and while the second target mark and the second state mark are displayed in the augmented reality space, when the operator makes an operation for tilting the imaging unit and the second state mark overlaps the second target mark and becomes stationary, the display controller indicates that the tilt angle of the imaging unit from the current imaging viewpoint is a tilt angle that satisfies the predetermined condition.

Third Aspect

The foot shape measurement apparatus described in the second aspect, in which a direction suggesting mark is displayed in a supplemental manner on the first state mark and the second target mark, the direction suggesting mark indicating a direction from the imaging viewpoint by the imaging unit toward the foot of the subject.

Fourth Aspect

The foot shape measurement apparatus described in one of the first to third aspects, further including
a predetermined reference sheet to be imaged together with the foot of the subject to detect a reference length in the augmented reality space, in which
the display controller displays a first foot shape mark to be superimposed, and also displays a second foot shape mark, the first foot shape mark indicating an area for placing one of feet to be measured in a predetermined position of the reference sheet that has been imaged by the imaging unit, the second foot shape mark indicating a position of the other one of the feet such that a gravity center position of the subject falls within a base of support when the imaging viewpoint becomes the predetermined angle to the foot of the subject, as a position outside the reference sheet that is preferable for placing the other one of the feet not to be measured.

Fifth Aspect

The foot shape measurement apparatus described in one of the first to fourth aspects, in which
the model generator stores a coordinate group of anatomical feature points of an average foot in a three-dimensional space beforehand as a three-dimensional homology model, the three-dimensional homology model including a predetermined number of contour points that have been defined beforehand, detects a contour from the foot image, moves a contour of the three-dimensional homology model toward the contour that has been detected to a position for minimizing a total sum of positional differences between the contour points and detected points included in the contour that has been detected, and brings the three-dimensional homology model in close proximity to the contour that has been detected, and
the contour of the foot in the three-dimensional homology model includes a first part having a relatively large individual difference and a second part having a small individual difference, and the predetermined number of contour points defined in the three-dimensional homology model are defined such that a space between contour points in the second part is wider than a space between contour points in the first part.

Sixth Aspect

The foot shape measurement apparatus described in one of the first to fourth aspects, in which the model generator stores a coordinate group of anatomical feature points of an average foot in a three-dimensional space beforehand as a three-dimensional homology model, the three-dimensional homology model including a predetermined number of contour points that have been defined beforehand, detects a contour from the foot image, moves a contour of the three-dimensional homology model toward the contour that has been detected to a position for minimizing a total sum of positional differences between the contour points and detected points included in the contour that has been detected, and brings the three-dimensional homology model in close proximity to the contour that has been detected, the contour of the foot in the three-dimensional homology model includes a plurality of points to be measured as a predetermined part size, and the model generator brings a contour point closer to the plurality of points to be measured among the predetermined number of contour points in the three-dimensional homology model in closer proximity to a detected point on a priority basis to make a positional difference from the detected point smaller.

Seventh Aspect

The foot shape measurement apparatus described in one of the first to fourth aspects, in which the model generator stores a coordinate group of anatomical feature points of an average foot in a three-dimensional space beforehand as a three-dimensional homology model, the three-dimensional homology model including a predetermined number of contour points that have been defined beforehand, detects a contour from the foot image, moves a contour of the three-dimensional homology model toward the contour that has been detected to a position for minimizing a total sum of positional differences between the contour points and detected points included in the contour that has been detected, and brings the three-dimensional homology model in close proximity to the contour that has been detected, and the model generator performs convex hull processing of omitting a convexity defect corresponding to a shape between toes in the contour that has been detected, and also brings the three-dimensional homology model in close proximity to the contour that has been detected to minimize the total sum of the positional differences between the contour points and detected points included in the contour, after the convex hull processing is performed.

Eighth Aspect

The foot shape measurement apparatus described in the one of the first to seventh aspects, further including a predetermined reference sheet that is a sheet to be imaged together with the foot of the subject to detect a reference length in the augmented reality space, the predetermined reference sheet including a first area and a second area, the first area being formed in a predetermined color that is likely to have a complementary color relationship to a color of the foot, as an area for placing the foot of the subject, the second area including a plurality of reference markers each having a predetermined shape to be referred to and to be arranged for detecting position coordinates, in which the space setter recognizes a position of the reference sheet in the image obtained by image recognition of the image that has been captured by the imaging unit, and sets the augmented reality space with the position of the reference sheet that has been recognized as a reference, and the model generator detects a color component range of the predetermined color included in the reference sheet that has been recognized from the image captured by the imaging unit before generation of the three-dimensional model, and recognizes a boundary between the foot of the subject and the first area from the foot image, based on the color component range that has been detected, and detects a contour of the foot of the subject.

Ninth Aspect

A computer program causing a computer to execute:

a function of setting an augmented reality space, based on an image captured by a predetermined imaging unit;

a function of displaying, on a screen, the image captured and a guide object arranged in the augmented reality space to guide an imaging procedure;

a function of acquiring a plurality of foot images that have been captured by imaging a foot of a subject from a plurality of angles;

a function of generating a three-dimensional model of the foot of the subject, based on the plurality of foot images; and a function of outputting a measurement result based on the three-dimensional model that has been generated, in which the function of displaying displays, as the guide object, a target mark and a state mark to be superimposed on a visual being captured, the target mark indicating a viewpoint position in which an imaging viewpoint by the predetermined imaging unit in the augmented reality space forms a predetermined angle to the foot of the subject, the state mark indicating a current state of the imaging viewpoint by the predetermined imaging unit in the augmented reality space, and the function of acquiring acquires, as the foot image that has been captured from the predetermined angle, the image to be captured when the imaging viewpoint by the predetermined imaging unit in the augmented reality space is present in the imaging viewpoint by which a display state of the target mark and a display state of the state mark each satisfy a predetermined condition.

What is claimed is:

1. A foot shape measurement apparatus comprising:

an imaging unit;

a display controller;

one or more processors; and a predetermined reference sheet to be imaged together with a foot of a subject to detect a reference length in an augmented reality space, wherein the one or more processors is configured to set the augmented reality space, based on an image captured by the imaging unit, the display controller structured to display, on a screen, the image captured by the imaging unit and a guide object to be arranged in the augmented reality space and to guide an imaging procedure, and the one or more processors is configured to acquire a plurality of foot images that have been captured by the imaging unit imaging the foot of the subject from a plurality of angles, generate a three-dimensional model of the foot of the subject, based on the plurality of foot images, and output a measurement result based on the three-dimensional model that has been generated, wherein the display controller displays, as the guide object, a target mark and a state mark to be superimposed on a visual being captured by the imaging unit, the target mark indicating a viewpoint position in which an imaging viewpoint of the imaging unit in the augmented reality space forms a predetermined angle to the foot of the subject, the state mark indicating a current state of the imaging viewpoint of the imaging unit in the augmented reality space, the one or more processors acquires, as the foot image that has been captured from the predetermined angle, the image to be captured when the imaging viewpoint by the imaging unit in the augmented reality space is present in the imaging viewpoint by which a display state of the target mark and a display state of the state mark each satisfy a predetermined condition, and the display controller displays a first foot shape mark to be superimposed, and also displays a second foot shape mark, the first foot shape mark indicating an area for placing one of feet to be measured in a predetermined position of the reference sheet that has been imaged by the imaging unit, the second foot shape mark indicating a position of the other one of the feet such that a gravity center position of the subject falls within a base of support when the imaging viewpoint becomes the predetermined angle to the foot of the subject, as a position outside the reference sheet that is preferable for placing the other one of the feet not to be measured.

2. The foot shape measurement apparatus according to claim 1, wherein a direction suggesting mark is displayed in a supplemental manner on the first state mark and the second target mark, the direction suggesting mark indicating a direction from the imaging viewpoint by the imaging unit toward the foot of the subject.

3. The foot shape measurement apparatus according to claim 1, wherein the one or more processors stores a coordinate group of anatomical feature points of an average foot in a three-dimensional space beforehand as a three-dimensional homology model, the three-dimensional homology model including a predetermined number of contour points that have been defined beforehand, detects a contour from the foot image, moves a contour of the three-dimensional homology model toward the contour that has been detected to a position for minimizing a total sum of positional differences between the contour points and detected points included in the contour that has been detected, and brings the three-dimensional homology model in close proximity to the contour that has been detected, and the contour of the foot in the three-dimensional homology model includes a first part having a relatively large individual difference and a second part having a small individual difference, and the predetermined number of contour points defined in the three-dimensional homology model are defined such that a space between contour points in the second part is wider than a space between contour points in the first part.

4. The foot shape measurement apparatus according to claim 1, wherein the one or more processors stores a coordinate group of anatomical feature points of an average foot in a three-dimensional space beforehand as a three-dimensional homology model, the three-dimensional homology model including a predetermined number of contour points that have been defined beforehand, detects a contour from the foot image, moves a contour of the three-dimensional homology model toward the contour that has been detected to a position for minimizing a total sum of positional differences between the contour points and detected points included in the contour that has been detected, and brings the three-dimensional homology model in close proximity to the contour that has been detected, the contour of the foot in the three-dimensional homology model includes a plurality of points to be measured as a predetermined part size, and the one or more processors brings a contour point closer to the plurality of points to be measured among the predetermined number of contour points in the three-dimensional homology model in closer proximity to a detected point on a priority basis to make a positional difference from the detected point smaller.

5. The foot shape measurement apparatus according to claim 1, wherein the one or more processors stores a coordinate group of anatomical feature points of an average foot in a three-dimensional space beforehand as a three-dimensional homology model, the three-dimensional homology model including a predetermined number of contour points that have been defined beforehand, detects a contour from the foot image, moves a contour of the three-dimensional homology model toward the contour that has been detected to a position for minimizing a total sum of positional differences between the contour points and detected points included in the contour that has been detected, and brings the three-dimensional homology model in close proximity to the contour that has been detected, and the one or more processors performs convex hull processing of omitting a convexity defect corresponding to a shape between toes in the contour that has been detected, and also brings the three-dimensional homology model in close proximity to the contour that has been detected to minimize the total sum of the positional differences between the contour points and detected points included in the contour, after the convex hull processing is performed.

6. The foot shape measurement apparatus according to claim 1, further comprising a predetermined reference sheet that is a sheet to be imaged together with the foot of the subject to detect a reference length in the augmented reality space, the predetermined reference sheet including a first area and a second area, the first area being formed in a predetermined color that is likely to have a complementary color relationship to a color of the foot, as an area for placing the foot of the subject, the second area including a plurality of reference markers each having a predetermined shape to be referred to and to be arranged for detecting position coordinates, wherein the one or more processors recognizes a position of the reference sheet in the image obtained by image recognition of the image that has been captured by the imaging unit, and sets the augmented reality space with the position of the reference sheet that has been recognized as a reference, and the one or more processors detects a color component range of the predetermined color included in the reference sheet that has been recognized from the image captured by the imaging unit before generation of the three-dimensional model, and recognizes a boundary between the foot of the subject and the first area from the foot image, based on the color component range that has been detected, and detects a contour of the foot of the subject.

7. The foot shape measurement apparatus according to claim 1, wherein the display controller indicates that a position of a current imaging viewpoint satisfies the predetermined condition when positions and sizes of the first state mark and the first target mark become substantially identical.

8. A non-transitory computer-readable storage medium storing a computer program that, when executed by one or more processors, causes the one or more processors to perform:

a function of setting an augmented reality space, based on an image captured by a predetermined imaging unit;

a function of displaying, on a screen, the image captured and a guide object arranged in the augmented reality space to guide an imaging procedure;

a function of acquiring a plurality of foot images that have been captured by imaging a foot of a subject from a plurality of angles;

a function of generating a three-dimensional model of the foot of the subject, based on the plurality of foot images; and a function of outputting a measurement result based on the three-dimensional model that has been generated, wherein the function of displaying displays, as the guide object, a target mark and a state mark to be superimposed on a visual being captured, the target mark indicating a viewpoint position in which an imaging viewpoint by the predetermined imaging unit in the augmented reality space forms a predetermined angle to the foot of the subject, the state mark indicating a current state of the imaging viewpoint by the predetermined imaging unit in the augmented reality space, the function of acquiring acquires, as the foot image that has been captured from the predetermined angle, the image to be captured when the imaging viewpoint by the predetermined imaging unit in the augmented reality space is present in the imaging viewpoint by which a display state of the target mark and a display state of the state mark each satisfy a predetermined condition, and the function of displaying displays a first foot shape mark to be superimposed, and also displays a second foot shape mark, the first foot shape mark indicating an area for placing one of feet to be measured in a predetermined position of a reference sheet that has been imaged together with the foot of the subject to detect a reference length in the augmented reality space by the imaging unit, the second foot shape mark indicating a position of the other one of the feet such that a gravity center position of the subject falls within a base of support when the imaging viewpoint becomes the predetermined angle to the foot of the subject, as a position outside the reference sheet that is preferable for placing the other one of the feet not to be measured.

9. The non-transitory computer-readable storage medium according to claim 8, wherein the computer program causes the one or more processors to perform a function of indicating that a position of a current imaging viewpoint satisfies the predetermined condition when positions and sizes of the first state mark and the first target mark become substantially identical.

\*   \*   \*   \*   \*